United States Patent
Yamamoto et al.

(10) Patent No.: US 10,621,423 B2
(45) Date of Patent: Apr. 14, 2020

(54) MOVING INFORMATION ANALYZING SYSTEM AND MOVING INFORMATION ANALYZING METHOD

(71) Applicant: Panasonic i-PRO Sensing Solutions Co., Ltd., Fukuoka (JP)

(72) Inventors: Hiroyuki Yamamoto, Ishikawa (JP); Junko Noda, Nagasaki (JP); Marie Kanda, Fukuoka (JP); Yoshihiro Sugishita, Osaka (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 285 days.

(21) Appl. No.: 15/380,114

(22) Filed: Dec. 15, 2016

(65) Prior Publication Data

US 2017/0185828 A1 Jun. 29, 2017

(30) Foreign Application Priority Data

Dec. 24, 2015 (JP) .................................. 2015-251778

(51) Int. Cl.
*G06T 7/292* (2017.01)
*G06K 9/00* (2006.01)
(Continued)

(52) U.S. Cl.
CPC ..... *G06K 9/00335* (2013.01); *G06K 9/00771* (2013.01); *G06K 9/46* (2013.01);
(Continued)

(58) Field of Classification Search
CPC ........................... G06K 9/00771; G06T 7/292
See application file for complete search history.

(56) References Cited

U.S. PATENT DOCUMENTS

| 4,179,704 A | 12/1979 | Moore et al. |
| 4,233,631 A | 11/1980 | Mahler |
| (Continued) | | |

FOREIGN PATENT DOCUMENTS

| JP | 8-242987 A | 9/1996 |
| JP | 11-64505 A | 3/1999 |
| (Continued) | | |

OTHER PUBLICATIONS

Final Office Action, dated Feb. 7, 2019, for U.S. Appl. No. 15/536,572, 9 pages.

(Continued)

*Primary Examiner* — Rowina J Cattungal
(74) *Attorney, Agent, or Firm* — Seed IP Law Group, LLP

(57) ABSTRACT

A moving information analyzing system includes a camera, and a server that is connected to the camera. The camera captures an image of an object region, extracts moving information regarding a staying position or a passing position of a moving object included in a captured image of the object region, outputs a count line for counting the number of moving objects and a count result of the number of moving objects having passed the count line, related to the moving information, and transmits the captured image and the moving information to the server in a predetermined transmission cycle. The server acquires the captured image and the moving information, generates a moving information analysis image in which the moving information is superimposed on the captured image and to which the count line and the count result are added, and displays the moving information analysis image on a monitor.

20 Claims, 22 Drawing Sheets

(51) Int. Cl.
*G06K 9/46* (2006.01)
*G06K 9/78* (2006.01)
*G06T 11/60* (2006.01)

(52) U.S. Cl.
CPC .............. *G06K 9/78* (2013.01); *G06T 7/292* (2017.01); *G06T 11/60* (2013.01); *G06T 2207/30232* (2013.01); *G06T 2207/30242* (2013.01)

(56) References Cited

U.S. PATENT DOCUMENTS

| | | | |
|---|---|---|---|
| 6,295,367 B1 | 9/2001 | Crabtree et al. | |
| 6,992,702 B1 | 1/2006 | Foote et al. | |
| 7,590,261 B1 | 9/2009 | Mariano et al. | |
| 7,957,565 B1 | 6/2011 | Sharma et al. | |
| 7,974,869 B1 | 7/2011 | Sharma et al. | |
| 8,009,863 B1* | 8/2011 | Sharma | G06K 9/00335 348/159 |
| 8,098,888 B1* | 1/2012 | Mummareddy | G06K 9/00778 382/103 |
| 8,098,891 B2 | 1/2012 | Lv et al. | |
| 8,189,926 B2 | 5/2012 | Sharma et al. | |
| 8,280,153 B2 | 10/2012 | Cobb et al. | |
| 8,289,390 B2 | 10/2012 | Aggarwal et al. | |
| 8,310,542 B2 | 11/2012 | Girgensohn et al. | |
| 8,355,046 B2 | 1/2013 | Fujii | |
| 8,380,558 B1 | 2/2013 | Sharma et al. | |
| 8,558,892 B2 | 10/2013 | Brodsky et al. | |
| 8,614,744 B2 | 12/2013 | Brown et al. | |
| 8,964,036 B2 | 2/2015 | Golan et al. | |
| 8,965,042 B2 | 2/2015 | Borger et al. | |
| 9,165,212 B1 | 10/2015 | Watanabe et al. | |
| 9,361,520 B2 | 6/2016 | Collins et al. | |
| 9,430,923 B2 | 8/2016 | Kniffen et al. | |
| 9,436,692 B1 | 9/2016 | Fang | |
| 9,569,786 B2 | 2/2017 | Shaw et al. | |
| 9,659,598 B2 | 5/2017 | Adam et al. | |
| 9,679,200 B2 | 6/2017 | Schlattmann et al. | |
| 9,858,297 B2* | 1/2018 | Park | G06F 16/51 |
| 9,875,408 B2 | 1/2018 | Adachi | |
| 10,120,536 B2 | 11/2018 | Cha et al. | |
| 2002/0085092 A1 | 7/2002 | Choi et al. | |
| 2003/0053659 A1 | 3/2003 | Pavlidis et al. | |
| 2005/0043933 A1 | 2/2005 | Rappaport et al. | |
| 2005/0169367 A1 | 8/2005 | Venetianer et al. | |
| 2005/0185823 A1 | 8/2005 | Brown et al. | |
| 2005/0288911 A1 | 12/2005 | Porikli | |
| 2006/0062431 A1 | 3/2006 | Low | |
| 2006/0187305 A1 | 8/2006 | Trivedi et al. | |
| 2006/0285723 A1 | 12/2006 | Morellas et al. | |
| 2007/0229663 A1 | 10/2007 | Aoto et al. | |
| 2007/0248244 A1 | 10/2007 | Sato et al. | |
| 2007/0296814 A1 | 12/2007 | Cooper et al. | |
| 2008/0130949 A1 | 6/2008 | Ivanov et al. | |
| 2008/0212099 A1 | 9/2008 | Chen | |
| 2009/0002489 A1 | 1/2009 | Yang et al. | |
| 2009/0134968 A1 | 5/2009 | Girgensohn et al. | |
| 2009/0222388 A1 | 9/2009 | Hua et al. | |
| 2009/0268028 A1 | 10/2009 | Ikumi et al. | |
| 2010/0002082 A1 | 1/2010 | Buehler et al. | |
| 2010/0013931 A1* | 1/2010 | Golan | G06K 9/00771 348/150 |
| 2010/0013935 A1 | 1/2010 | Ma et al. | |
| 2010/0045799 A1 | 2/2010 | Lei et al. | |
| 2010/0255765 A1 | 10/2010 | Ghinelli | |
| 2011/0002548 A1 | 1/2011 | Sivakumar et al. | |
| 2011/0072037 A1 | 3/2011 | Lotzer | |
| 2011/0199461 A1 | 8/2011 | Horio et al. | |
| 2011/0205355 A1 | 8/2011 | Liu et al. | |
| 2011/0231419 A1 | 9/2011 | Papke et al. | |
| 2012/0045149 A1 | 2/2012 | Arai et al. | |
| 2012/0163657 A1* | 6/2012 | Shellshear | G06T 7/20 382/103 |
| 2012/0242853 A1 | 9/2012 | Jasinski et al. | |
| 2013/0091432 A1 | 4/2013 | Shet et al. | |
| 2013/0147961 A1 | 6/2013 | Gao et al. | |
| 2013/0223688 A1 | 8/2013 | Golan et al. | |
| 2014/0023233 A1 | 1/2014 | Stefanovic | |
| 2014/0119594 A1* | 5/2014 | Chou | G07C 9/00 382/103 |
| 2014/0125805 A1 | 5/2014 | Golan et al. | |
| 2014/0226855 A1 | 8/2014 | Savvides et al. | |
| 2014/0355829 A1 | 12/2014 | Heu et al. | |
| 2015/0120237 A1 | 4/2015 | Gouda et al. | |
| 2015/0187088 A1 | 7/2015 | Iwai et al. | |
| 2015/0222861 A1 | 8/2015 | Fujii et al. | |
| 2015/0278608 A1 | 10/2015 | Matsumoto et al. | |
| 2015/0286866 A1 | 10/2015 | Kawaguchi et al. | |
| 2015/0289111 A1 | 10/2015 | Ozkan | |
| 2015/0294183 A1 | 10/2015 | Watanabe et al. | |
| 2015/0379725 A1 | 12/2015 | Kuwahara et al. | |
| 2016/0063712 A1 | 3/2016 | Matsumoto et al. | |
| 2016/0104174 A1 | 4/2016 | Matsumoto et al. | |
| 2016/0142679 A1 | 5/2016 | Miyoshi et al. | |
| 2016/0307049 A1 | 10/2016 | Hagisu et al. | |
| 2016/0309096 A1 | 10/2016 | Hagisu et al. | |
| 2016/0349972 A1 | 12/2016 | Miyoshi et al. | |
| 2017/0330330 A1 | 11/2017 | Seki et al. | |
| 2017/0330434 A1 | 11/2017 | Takahashi et al. | |
| 2017/0337426 A1 | 11/2017 | Werner et al. | |
| 2017/0351924 A1 | 12/2017 | Hotta et al. | |
| 2017/0352380 A1 | 12/2017 | Doumbouya et al. | |
| 2018/0048789 A1 | 2/2018 | Hayashi | |

FOREIGN PATENT DOCUMENTS

| | | |
|---|---|---|
| JP | 11-144192 A | 5/1999 |
| JP | 2003-205159 A | 7/2003 |
| JP | 2003-256843 A | 9/2003 |
| JP | 2005-148863 A | 6/2005 |
| JP | 2006-309280 A | 11/2006 |
| JP | 2008-76234 A | 4/2008 |
| JP | 2009/134688 A | 6/2009 |
| JP | 2009-265830 A | 11/2009 |
| JP | 2010-231629 A | 10/2010 |
| JP | 2011-248836 A | 12/2011 |
| JP | 2011-254289 A | 12/2011 |
| JP | 2012-203680 A | 10/2012 |
| JP | 5597762 B1 | 10/2014 |
| JP | 5597781 B1 | 10/2014 |
| JP | 5683663 B1 | 3/2015 |
| JP | 2015-149557 A | 8/2015 |
| JP | 2015-149558 A | 8/2015 |
| JP | 2015-149559 A | 8/2015 |
| JP | 2015-203912 A | 11/2015 |
| JP | 2016-15540 A | 1/2016 |
| JP | 2016-15579 A | 1/2016 |
| JP | 5838371 B1 | 1/2016 |
| WO | 2010/044186 A1 | 4/2010 |
| WO | 2013/072401 A2 | 5/2013 |

OTHER PUBLICATIONS

International Search Report, dated Jun. 21, 2016, for corresponding International Application No. PCT/JP2016/001685, 4 pages.
International Search Report, dated Jul. 5, 2016, for International Application No. PCT/JP2016/002063, 9 pages.
Mobotix, "MxAnalytics Camera-Integrated Video Analysis With the MOBOTIX Q24," Secutiry Vision Systems, 6 pages.
Mobotix, "An innovative monitor camera MOBOTIX Q24, 360° coverage can be monitored by only one camera never seen before," [online], OPN Corporation, 2014, retrieved on Jun. 16, 2014, 13 pages.
Non-Final Office Action, dated Aug. 23, 2018, for U.S. Appl. No. 15/536,572, 9 pages.
Non-Final Office Action, dated Jun. 13, 2019, for U.S. Appl. No. 15/536,572, 9 pages.

\* cited by examiner

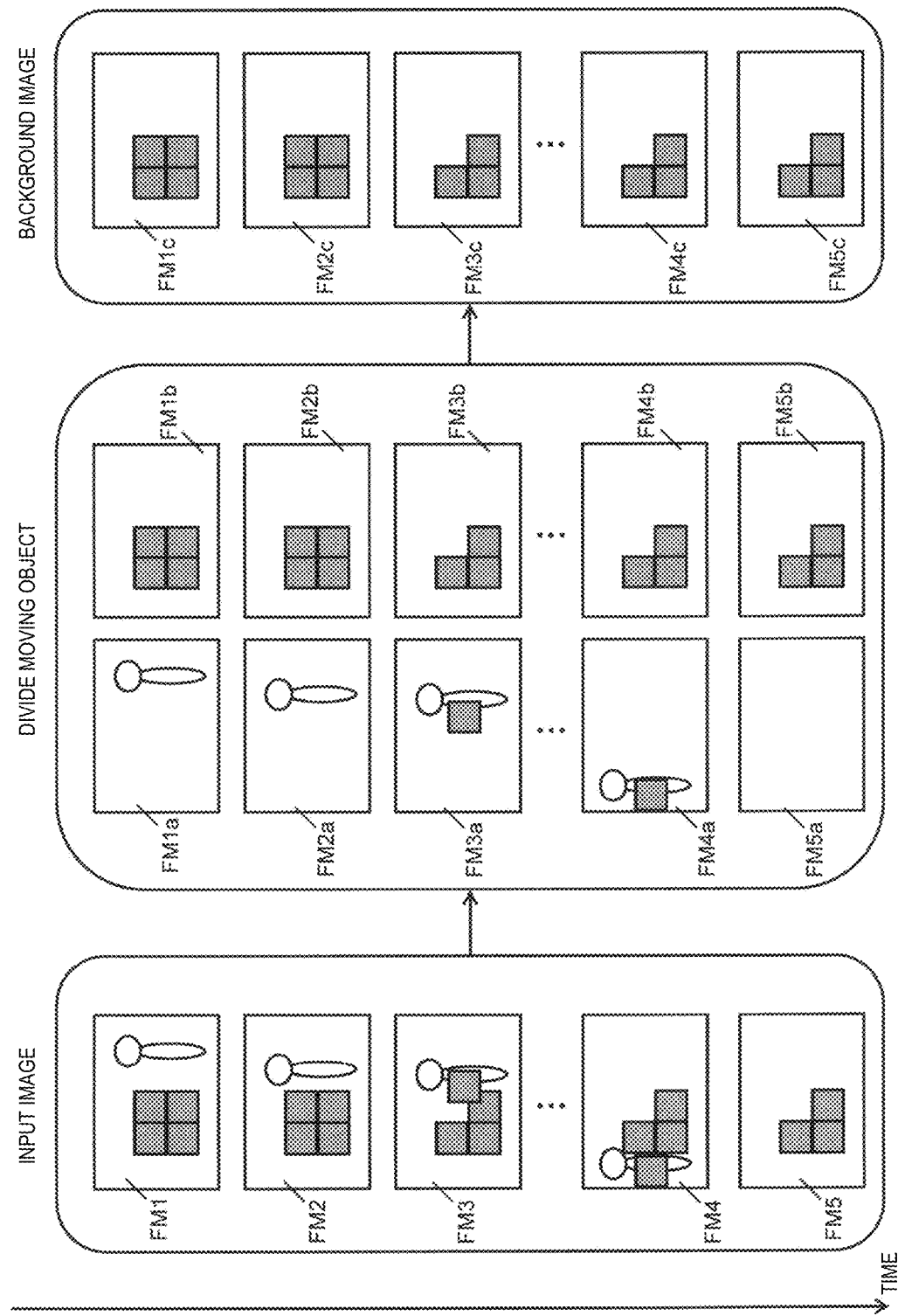

FIG. 12

| HIGHEST ATMOSPHERIC TEMPERATURE O DEGREES (LAST YEAR X DEGREES) | OPEN |
|---|---|
| LOWEST ATMOSPHERIC TEMPERATURE O DEGREES (LAST YEAR X DEGREES) | CLOSED |

••GROUP STORE A FOOD SALES AREA
REPORT IN MAY, 2014
BASIC INFORMATION

NUMBER OF VISITORS 12000
(LAST YEAR 10000)
MAXIMUM STAYING May 11 (SUN)
14:00     (800)

EVENT SCHEDULE
5/11 MOTHER'S DAY SALE
5/18 LAYOUT CHANGE
5/24 LIVE EVENT
REMARK
XXXX

VISITOR CONFIGURATION
- FEMALE TO TWENTIES
- FEMALE TWENTIES TO FORTIES
- FEMALE FORTIES TO SIXTIES
- FEMALE SIXTIES TO
- MALE TO TWENTIES
- MALE TWENTIES TO FORTIES
- MALE FORTIES TO SIXTIES
- MALE SIXTIES TO

SALES           1Q TOTAL
RESULT          OOO YEN
TARGET          OOO YEN (X%)
LAST YEAR       OOO YEN (X%)
LAST MONTH      OOO YEN (X%)

SALES CONFIGURATION
- FOOD (+a%)
- CLOTHING (+b%)
- EAT-OUT (-c%)
- OTHERS

■RESULT  ■PLANNING
■LAST YEAR
APRIL MAY JUNE

[BEFORE LAYOUT CHANGE]

[AFTER LAYOUT CHANGE]

KR   MOTHER'S DAY SALE   DAY

KR   MOTHER'S DAY SALE   DAY

CR1
HM6
RPT
SR1
HM5
CT5
CT6

MOVING INFORMATION ANALYZING SYSTEM AND MOVING INFORMATION ANALYZING METHOD

BACKGROUND

1. Technical Field

The present disclosure relates to a moving information analyzing system, and a moving information analyzing method capable of generating a moving information analysis image in which staying information or passing information of a moving object such as a person is superimposed on an image captured by the camera.

2. Description of the Related Art

As the related art in which a level of activity of a person over a period of time at an imaging site where a camera is provided is displayed as a heat map image, for example, Japanese Patent Unexamined Publication No. 2009-134688 is known.

Japanese Patent Unexamined Publication No. 2009-134688 discloses a technique of analyzing moving information of a person at the imaging site where a security camera connected to a network is provided so as to calculate a level of activity, generating a heat map image in which a detection result from a sensor is superimposed on a floor plan of the imaging site, and displaying the heat map image on a browser screen corresponding to the security camera. Consequently, it is possible to understand a level of activity of the person at the imaging site by viewing the heat map image displayed on the browser screen.

Japanese Patent Unexamined Publication No. 2015-203912 discloses a technique of measuring the number of people having passed through a doorway on the basis of a captured image. In Japanese Patent Unexamined Publication No. 2015-203912, in a case where moving information of each person detected from a captured image is acquired, the moving information is detected to be interrupted in the vicinity of a doorway, and it is determined that a background image in which the doorway is reflected is similar to a person image in which a person is reflected in the captured image, the person is regarded as having passed through the doorway, and the person is counted as a counting object. Consequently, it is possible to improve the accuracy in counting the number of people, by reducing missed counts of people, even in a situation in which detection of persons is failed due to the occurrence of an event in which identification between persons and a background is difficult.

Here, a case is assumed in which a camera captures an image of a predetermined imaging region (for example, a predefined position in a store), and a moving information analysis image in which staying information or passing information of a moving object such as a person in each imaging region is superimposed on the captured image is generated and displayed.

When a moving information analysis image is generated in which staying information or passing information of a moving object is superimposed on an image captured by the camera, it is possible to visually understand a situation in which the moving object stays or moves on the basis of a path, a color, or the like of moving information from a heat map image. However, in order to specify an actual number of moving objects having passed through a doorway, it is necessary to display a measurement value obtained by measuring the number of moving objects in the moving information analysis image. In the technique disclosed in Japanese Patent Unexamined Publication No. 2015-203912, the number of people having passed through the doorway in the vicinity of the doorway can be counted with high accuracy, but, for example, the number of moving objects at any location in an imaging region, such as a specific sales area in the store is hardly understood in the moving information analysis image.

SUMMARY

In order to solve the above-described problem of the related art, an object of the present disclosure is to provide a moving information analyzing system, and a moving information analyzing method capable of generating a moving information analysis image in which the number of moving objects at any location in an imaging region can be easily understood.

According to the present disclosure, there is provided a moving information analyzing system including a camera; and a server that is connected to the camera, in which the camera captures an image of an object region, extracts moving information regarding a staying position or a passing position of a moving object included in a captured image of the object region, outputs a count line for counting the number of moving objects and a count result of the number of moving objects having passed the count line, related to the moving information, and transmits the captured image and the moving information to the server in a predetermined transmission cycle, and in which the server acquires the captured image and the moving information transmitted from the camera, generates a moving information analysis image in which the moving information is superimposed on the captured image and to which the count line and the count result are added, and displays the moving information analysis image on a monitor connected to the server.

According to the present disclosure, there is provided a moving information analyzing method for a moving information analyzing system in which a camera is connected to a server, the method including causing the camera to capture an image of an object region, to extract moving information regarding a staying position or a passing position of a moving object included in a captured image of the object region, to output a count line for counting the number of moving objects and a count result of the number of moving objects having passed the count line, related to the moving information, and to transmit the captured image and the moving information to the server in a predetermined transmission cycle; and causing the server to acquire the captured image and the moving information transmitted from the camera, to generate a moving information analysis image in which the moving information is superimposed on the captured image and to which the count line and the count result are added, and to display the moving information analysis image on a monitor connected to the server.

According to the present disclosure, it is possible to generate a moving information analysis image in which the number of moving objects at any location in an imaging region can be easily understood.

BRIEF DESCRIPTION OF THE DRAWINGS

FIG. 3 is a diagram illustrating a summary of an operation of a background image generating section of the camera of the present exemplary embodiment;

FIG. 12 is a diagram illustrating an example of an operation screen of a monthly report related to a food sales area of the store A, dated in May, 2014, generated by a report generating output section of the server of the present exemplary embodiment;

DETAILED DESCRIPTION

Hereinafter, a description will be made of an exemplary embodiment (hereinafter, referred to as "the present exemplary embodiment") in which a moving information analyzing system a moving information analyzing method according to the present disclosure are specifically disclosed with reference to the drawings. The present disclosure may be defined as a moving information analysis image generating method including an operation (step) in which the camera generates a moving information analysis image (which will be described later). However, a detailed description more than necessary will be omitted in some cases. For example, a detailed description of the well-known content or a repeated description of the substantially same configuration will be omitted in some cases. This is so that a person skilled in the art can easily understand the present disclosure by preventing the following description from being unnecessarily redundant. The accompanying drawings and the following description are provided in order for a person skilled in the art to fully understand the present disclosure, and are not intended to limit the subject matter recited in the claims.

Figure 1:
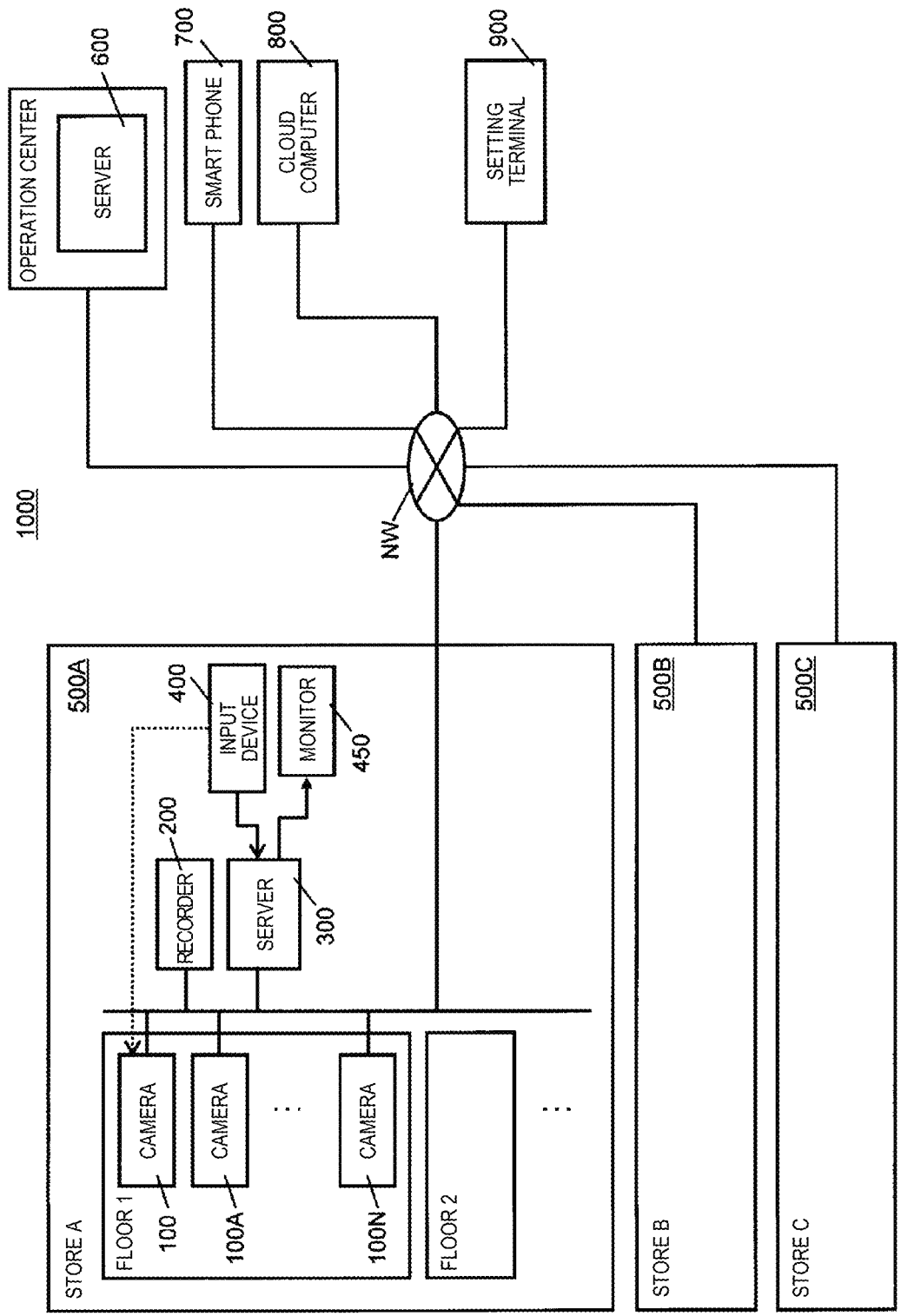
FIG. 1 is a system configuration diagram illustrating details of a configuration of a sales management system including a moving information analyzing system of the present exemplary embodiment.

In the following present exemplary embodiment, as illustrated in FIG. 1, a description thereof will be made, for example, assuming use of sales management system 1000 in which moving information analyzing systems 500A, 500B, 500C, . . . related to the present disclosure are respectively provided in a plurality of stores (store A, store B, store C, . . . ), and the plurality of moving information analyzing systems 500A, 500B, 500C, . . . are connected to each other via network NW. However, exemplary embodiments of the moving information analyzing system, a camera, and a moving information analyzing method related to the present disclosure are not limited to content of the present exemplary embodiment to be described later.

FIG. 1 is a system configuration diagram illustrating details of a configuration of sales management system 1000 including moving information analyzing systems 500A, 500B, 500C, . . . of the present exemplary embodiment. Sales management system 1000 illustrated in FIG. 1 includes moving information analyzing systems 500A, 500B, 500C, . . . which are respectively provided in a plurality of stores A, B, C, . . . , server 600 of an operation center, smart phone 700, cloud computer 800, and setting terminal 900.

Respective moving information analyzing systems 500A, 500B, 500C, . . . , server 600 of the operation center, smart phone 700, the cloud computer 800, and setting terminal 900 are connected to each other via network NW. Network NW is wireless network or a wired network. The wireless network is, for example, a wireless local area network (LAN), a wireless wide area network (WAN), 3G, long term evolution (LTE), or wireless gigabit (WiGig). The wired network is, for example, an intranet or the Internet.

Moving information analyzing system 500A provided in store A includes a plurality of cameras 100, 100A, . . . , and 100N provided in floor 1, recorder 200, server 300, input device 400, and monitor 450 illustrated in FIG. 1. In the same manner as in floor 1, a plurality of cameras are provided in floor 2, and the cameras in floor 2 are not illustrated. Internal configurations of respective cameras 100, 100A, . . . , and 100N are the same as each other, and details thereof will be described later with reference to FIG. 2.

Recorder 200 is configured by using, for example, a semiconductor memory or a hard disk device, and stores data on an image captured by each of the cameras provided in store A (hereinafter, the image captured by the camera is referred to as a "captured image"). The data on the captured image stored in recorder 200 is provided for monitoring work such as crime prevention.

Server 300 is configured by using, for example, a personal computer (PC), and notifies camera 100 of the occurrence of a predetermined event (for example, a change in a layout of a sales area of floor 1 of store A) in response to an input operation performed by a user (who is a user of, for example, the moving information analyzing system and indicates a salesperson or a store manager of store A; this is also the same for the following description) who operates input device 400.

Server 300 generates a moving information analysis image in which moving information regarding a staying position or a passing position of a moving object (for example, a person such as a salesperson, a store manager, or a store visitor; this is also the same for the following description) in an imaging region of the camera (for example, camera 100) on a captured image obtained by the camera (for example, camera 100) by using data (which will be described later) transmitted from the camera (for example, camera 100), and displays the image on monitor 450.

Server 300 performs a predetermined process (for example, a process of generating a moving information analysis report which will be described later) in response to an input operation performed by the user operating input device 400, and displays the moving information analysis report on monitor 450. Details of an internal configuration of server 300 will be described later with reference to FIG. 2.

Input device 400 is configured by using, for example, a mouse, a keyboard, a touch panel, or a touch pad, and outputs a signal corresponding to a user's input operation to camera 100 or server 300. In FIG. 1, for simplification of illustration, an arrow is shown only between input device 400 and camera 100, but arrows may be shown between input device 400 and other cameras (for example, cameras 100A and 100N).

Monitor 450 is configured by using, for example, a liquid crystal display (LCD) or an organic electroluminescence (EL) display, and displays data related to a moving information analysis image or a moving information analysis report generated by server 300. Monitor 450 is provided as an external apparatus separately from server 300, but may be included in server 300.

Server 600 of the operation center is a viewing apparatus which acquires and displays moving information analysis images or moving information analysis reports generated by moving information analyzing systems 500A, 500B, 500C, . . . provided in the respective stores A, B, C, . . . in response to an input operation performed by an employee (for example, an officer) of the operation center who operates server 600 of the operation center. Server 600 of the operation center holds various information pieces (for example, sales information, information regarding the number of visitors, event schedule information, the highest atmospheric temperature information, and the lowest atmospheric temperature information) required to generate a moving information analysis report (refer to FIG. 12). These various information pieces may be held in the servers provided in respective stores A, B, C, . . . . Server 600 of the operation center may perform each process which is performed by the server (for example, server 300 of store A) provided in each of stores A, B, C, . . . . Consequently, server 600 of the operation center can integrate data from the respective stores A, B, C, . . . so as to generate a moving information analysis report (for example, refer to FIG. 12 to be described later) and thus to acquire specific data (for example, a moving information analysis report illustrated in FIG. 12) related to one store selected through an input operation on server 600 of the operation center, or to display a data comparison result between specific sales areas (for example, meat sales areas) of a plurality of stores.

Smart phone 700 is a viewing apparatus which acquires and displays moving information analysis images or moving information analysis reports generated by moving information analyzing systems 500A, 500B, 500C, . . . provided in the respective stores A, B, C, . . . in response to an input operation performed by an employee (for example, a sales representative) of the operation center who operates smart phone 700.

The cloud computer 800 is an online storage which stores data related to moving information analysis images or moving information analysis reports generated by moving information analyzing systems 500A, 500B, 500C, . . . provided in the respective stores A, B, C, . . . , and performs a predetermined process (for example, retrieval and extraction of a moving information analysis report dated on the Y-th day of the X month) in response to an input operation performed by an employee (for example, a sales representative) of the operation center who operates smart phone 700 and displays a process result on smart phone 700.

Setting terminal 900 is configured by using, for example, a PC, and can execute dedicated browser software for displaying a setting screen of the camera of moving information analyzing systems 500A, 500B, 500C, . . . provided in the respective stores A, B, C, . . . . Setting terminal 900 displays a setting screen (for example, a common gateway interface (CGI)) of the camera by using the browser software in response to an input operation of an employee (for example, a system manager of sales management system 1000) of the operation center operating setting terminal 900, and sets information regarding the camera by editing (correcting, adding, and deleting) the information.

Camera

Figure 2:
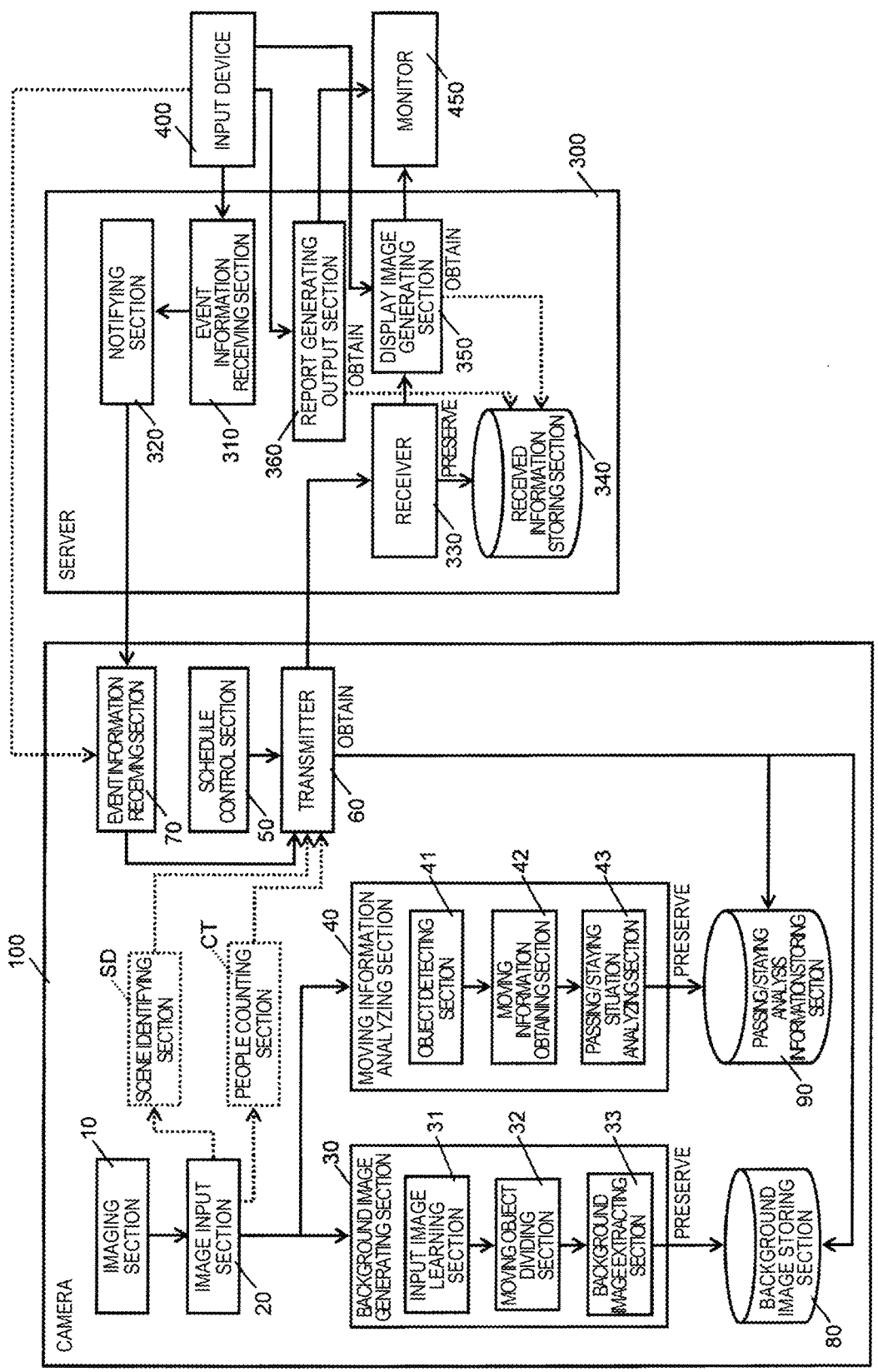
FIG. 2 is a block diagram illustrating details of a functional internal configuration of each of a camera and a server of the present exemplary embodiment.

FIG. 2 is a block diagram illustrating details of a functional internal configuration of each of camera 100 and server 300 of the present exemplary embodiment. In sales management system 1000 illustrated in FIG. 1, the cameras provided in the respective stores A, B, C, . . . have the same configuration, and thus camera 100 will be described as an example in FIG. 2.

Camera 100 illustrated in FIG. 2 includes imaging section 10, image input section 20, background image generating section 30, moving information analyzing section 40, schedule control section 50, transmitter 60, event information receiving section 70, background image storing section 80, and passing/staying information storing section 90. Background image generating section 30 includes input image learning section 31, moving object dividing section 32, and background image extracting section 33. Moving information analyzing section 40 includes object detecting section 41, moving information obtaining section 42, and passing/staying situation analyzing section 43.

Imaging section 10 includes at least a lens and an image sensor. The lens collects light (light beams) which is incident from the outside of camera 100 and forms an image on an imaging surface of the image sensor. As the lens, a fish-eye lens, or a wide angle lens which can obtain an angle of view of 140 degrees or greater is used. The image sensor is a solid-state imaging element such as a charge-coupled device (CCD) or a complementary metal oxide semiconductor (CMOS), and converts an optical image formed on the imaging surface into an electric signal.

Image input section 20 is configured by using, for example, a central processing unit (CPU), a micro-processing unit (MPU), or a digital signal processor (DSP), and performs a predetermined signal process using the electric signal from imaging section 10 so as to generate data (frame) for a captured image defined by red, green, and blue (RGB) or YUV (luminance and color difference) which can be recognized by the human eye, and outputs the data to background image generating section 30 and moving information analyzing section 40.

Background image generating section 30 is configured by using, for example, a CPU, an MPU, or a DSP, and generates a background image obtained by removing a moving object (for example, a person) included in the captured image for every data item (frame) for the captured image output from image input section 20 at a predetermined frame rate (for example, 30 frames per second (fps)), and preserves the background image in background image storing section 80. The process of generating a background image in background image generating section 30 may employ an image processing method disclosed in, for example, Japanese Patent Unexamined Publication No. 2012-203680, but is not limited to this method.

Figure 4A:
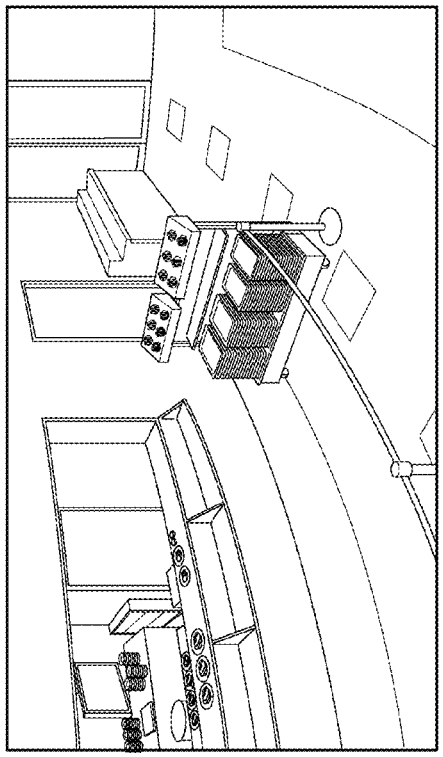
FIG. 4A is a diagram illustrating an example of a captured image which is input into an image input section.
Figure 4B:
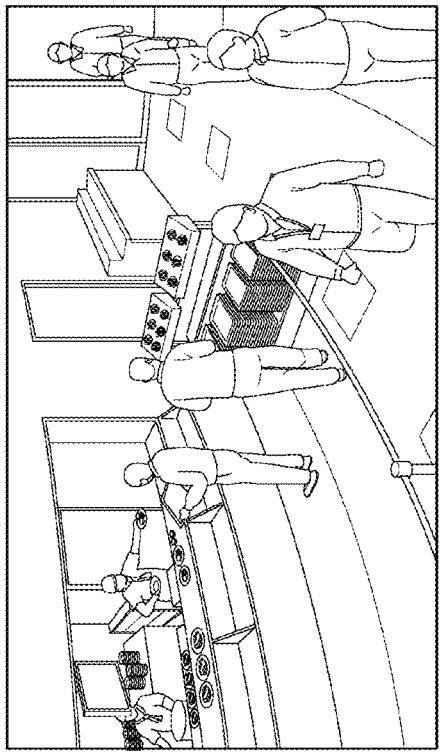
FIG. 4B is a diagram illustrating an example of a background image generated by the background image generating section.

Here, a summary of an operation of background image generating section 30 will be described briefly with reference to FIGS. 3 to 4B. FIG. 3 is a diagram illustrating a summary of an operation of background image generating section 30 of camera 100 according to the present exemplary embodiment. FIG. 4A is a diagram illustrating an example of a captured image which is input to image input section 20. FIG. 4B is a diagram illustrating an example of a background image generated by background image generating section 30.

FIG. 3 schematically illustrates results generated by input image learning section 31, moving object dividing section 32, and background image extracting section 33 from the left side to the right side of the figure perpendicular to a time axis which is directed from the top to the bottom of the figure, and illustrates a state in which a visitor to the store carries one corrugated cardboard among four corrugated cardboards for drinks.

Input image learning section 31 analyzes the distribution of luminance and color difference in each pixel in frames (for example, respective frames FM1 to FM5 illustrated in FIG. 3) of a plurality of captured images output from image input section 20.

Moving object dividing section 32 divides the respective frames FM1 to FM5 of the captured images into information (for example, refer to frames FM1a to FM5a) regarding a moving object (for example, a person) and information (for example, refer to frames FM1b to FM5b) regarding a portion (for example, a background) other than the moving object, by using a result (that is, an analysis result of the distribution situation of the luminance and the color difference in each pixel of the plurality of frames (for example, in the time axis direction illustrated in FIG. 3)) of input image learning section 31. In the frames FM3 and FM4 of the captured images showing a state in which the person as a moving object carries the corrugated cardboard, values of luminance and color differences corresponding to pixels of the corrugated cardboard carried by the person change in the time axis direction (for example, refer to FIG. 3), and thus moving object dividing section 32 regards the corrugated cardboard carried by the person as a moving object.

Background image extracting section 33 extracts frames FM1b to FM5b in which the information regarding the portion other than the moving object is shown among the information pieces divided by moving object dividing section 32, as frames FM1c to FM5c for background images corresponding to frames FM1 to FM5 of the captured images output from image input section 20, and preserves the frames in background image storing section 80.

In frame FM10a of a captured image illustrated in FIG. 4A, for example, a person providing food and a person receiving the food on a tray in a restaurant are shown as moving objects. In contrast with frame FM10a of the captured image illustrated in FIG. 4A, in frame FM10c (refer to FIG. 4B) of a background image generated by background image generating section 30, the person providing the food and the person receiving the food as moving objects in the same restaurant are removed so that neither of the two persons are shown.

Moving information analyzing section 40 is configured by using, for example, a CPU, an MPU, or a DSP, and detects moving information regarding a staying position or a passing position of a moving object (for example, a person) included in the captured image for every data item (frame) regarding the captured image output from image input section 20 at a predetermined frame rate (for example, 10 fps), and preserves the background image in passing/staying information storing section 90.

Object detecting section 41 performs a predetermined process image process (for example, a person detection process or a face detection process) on a frame of a captured image output from image input section 20 so as to detect the presence or absence of a moving object (for example, a person) included in the frame of the captured image. In a case where a moving object included in the frame of the captured image is detected, object detecting section 41 outputs information (for example, frame coordinate information) regarding a detection region of the moving object in the frame of the captured image, to moving information obtaining section 42. In a case where a moving object included in the frame of the captured image is not detected, object detecting section 41 outputs information (for example, predetermined null information) regarding a detection region of the moving object, to moving information obtaining section 42.

Moving information obtaining section 42 associates the present and past information pieces regarding the detection region with each other by using the information regarding the captured image output from image input section 20 and the past information (for example, captured image information or coordinate information) regarding the detection region of the moving object on the basis of the information regarding the detection region of the moving object output from object detecting section 41, and outputs the association result to passing/staying situation analyzing section 43 as moving information (for example, an amount of change in the coordinate information of the detection region of the moving object).

Passing/staying situation analyzing section 43 extracts and generates, from a plurality of captured images, moving information (for example, "object position information", "moving information", and "information regarding a passing situation or a staying situation") regarding a staying position or a passing position of the moving object (for example, a person) in the frame of the captured image on the basis of the moving information output from moving information obtaining section 42. Passing/staying situation analyzing section 43 may generate a color portion visualizing image of a moving information analysis image (heat map image) generated in display image generating section 350 of server 300 by using the extraction result of the moving information regarding the staying position or the passing position of the moving object (for example, a person).

By using moving information for frames of a plurality of captured images, passing/staying situation analyzing section 43 can extract and generate accurate moving information regarding a position where a moving object (for example, a person) stays or passes from the frames of the captured images which are output from image input section 20.

Schedule control section 50 is configured by using, for example, a CPU, an MPU, or a DSP, and gives, to transmitter 60, an instruction for a predetermined transmission cycle for periodically transmitting, to server 300, the background image data preserved in background image storing section 80 and the extraction result data of the moving information regarding the staying information or the passing information of the moving object preserved in passing/staying information storing section 90. The predetermined transmission cycle is, for example, 15 minutes, an hour, 12 hours, or 24 hours, and is not limited to such intervals.

Transmitter 60 obtains and transmits the background image data preserved in background image storing section 80 and the extraction result data of the moving information regarding the staying information or the passing information of the moving object preserved in passing/staying information storing section 90 to server 300 in response to the instruction from schedule control section 50 or event information receiving section 70. Transmission timing in transmitter 60 will be described later with reference to FIGS. 5 to 8.

Event information receiving section 70 as an example of an event information obtaining section receives (obtains) a notification of detection of a predetermined event (for example, a change in a layout of a sales area of floor 1 of store A) from server 300 or input device 400, and outputs, to transmitter 60, an instruction for transmitting, to server 300, the background image data preserved in background image storing section 80 and the extraction result data of the moving information regarding the staying information or the passing information of the moving object preserved in passing/staying information storing section 90 when receiving the notification of detection of the predetermined event.

Background image storing section 80 is configured by using, for example, a semiconductor memory or a hard disk device, and stores the data (frame) regarding the background image generated by background image generating section 30.

Passing/staying information storing section 90 is configured by using, for example, a semiconductor memory or a hard disk device, and stores the extraction result data (for example, "object position information", "moving information", and "information regarding a passing situation or a staying situation") of the moving information regarding the staying position or the passing position of the moving object (for example, a person), generated by moving information analyzing section 40.

Camera 100 illustrated in FIG. 2 may be provided with scene identifying section SD which performs an operation as follows (for example, refer to FIG. 13) instead of event information receiving section 70. Scene identifying section SD as an example of an image change detecting section determines whether or not there is a change (for example, an event such as a change of a layout of a sales area of floor 1 of store A) in a captured image output from image input section 20. In a case where a change in the captured image is detected, scene identifying section SD outputs, to transmitter 60, an instruction for transmitting, to server 300, the background image data preserved in background image storing section 80 and the extraction result data of the moving information regarding the staying information or the passing information of the moving object preserved in passing/staying information storing section 90.

Camera 100 illustrated in FIG. 2 may be further provided with people counting section CT which performs an operation as follows (for example, refer to FIG. 13). People counting section CT as an example of a moving object detecting section performs a predetermined image process (for example, a person detecting process) on a captured image output from image input section 20 so as to count the number of detected moving objects included in the captured image. People counting section CT outputs information regarding the number of detected moving objects included in the captured image to transmitter 60.

Server

Server 300 illustrated in FIG. 2 includes event information receiving section 310, notifying section 320, receiver 330, received information storing section 340, display image generating section 350, and report generating output section 360.

In a case where information indicating that a predetermined event (for example, a change of a layout of a sales area of floor 1 of store A) has occurred for each corresponding camera (for example, camera 100) and is input from input device 400, event information receiving section 310 receives a notification of detection of the predetermined event. Event information receiving section 310 outputs information indicating that the notification of detection of the predetermined event has been received, to notifying section 320. The information indicating that a predetermined event has occurred includes an identification number (for example, C1, C2, . . . which will be described later) of the camera which images a location where the predetermined event has occurred as an imaging region.

Notifying section 320 transmits the notification of detection of the predetermined event, output from event information receiving section 310, to a corresponding camera (for example, camera 100).

Receiver 330 receives the data (that is, the background image data preserved in background image storing section 80 and the extraction result data of the moving information regarding the staying information or the passing information of the moving object preserved in passing/staying information storing section 90) transmitted from transmitter 60 of camera 100, and outputs the data to received information storing section 340 and display image generating section 350.

Received information storing section 340 is configured by using, for example, a semiconductor memory or a hard disk device, and stores the data (that is, the background image data preserved in background image storing section 80 and the extraction result data of the moving information regarding the staying information or the passing information of the moving object preserved in passing/staying information storing section 90) received by receiver 330.

Display image generating section 350 as an example of an image generating section is configured by using, for example, a CPU, an MPU, or a DSP. Display image generating section 350 generates a moving information analysis image in which the moving information regarding the staying position and the passing position of the moving object on the background image in a case where an instruction for generating a moving information analysis image for display is input from input device 400. When the moving information analysis image is generated, display image generating section 350 generates the image by using the data (that is, the background image data preserved in background image storing section 80 and the extraction result data of the moving information regarding the staying information or the passing information of the moving object preserved in passing/staying information storing section 90) obtained from receiver 330 or received information storing section 340.

The moving information analysis image is an image in which the moving information visually indicating a location at which a moving object stays or a location through which the moving object passes is quantitatively visualized within a predetermined range (for example, values of 0 to 255) such as in a heat map in an imaging region corresponding to a captured image on the background image obtained by removing the moving object (for example, a person) which thus is not shown from the captured image acquired by camera 100. Display image generating section 350 as an example of a display control section displays the generated moving information analysis image on monitor 450.

Report generating output section 360 as an example of a report generating section is configured by using, for example, a CPU, an MPU, or a DSP, and generates a moving information analysis report (for example, refer to FIG. 12) which will be described later in a case where an instruction for generating the moving information analysis report is input from input device 400. Report generating output section 360 as an example of a display control section displays the generated moving information analysis report on monitor 450.

Process of Transmitting Data from Camera to Server

Figure 5:
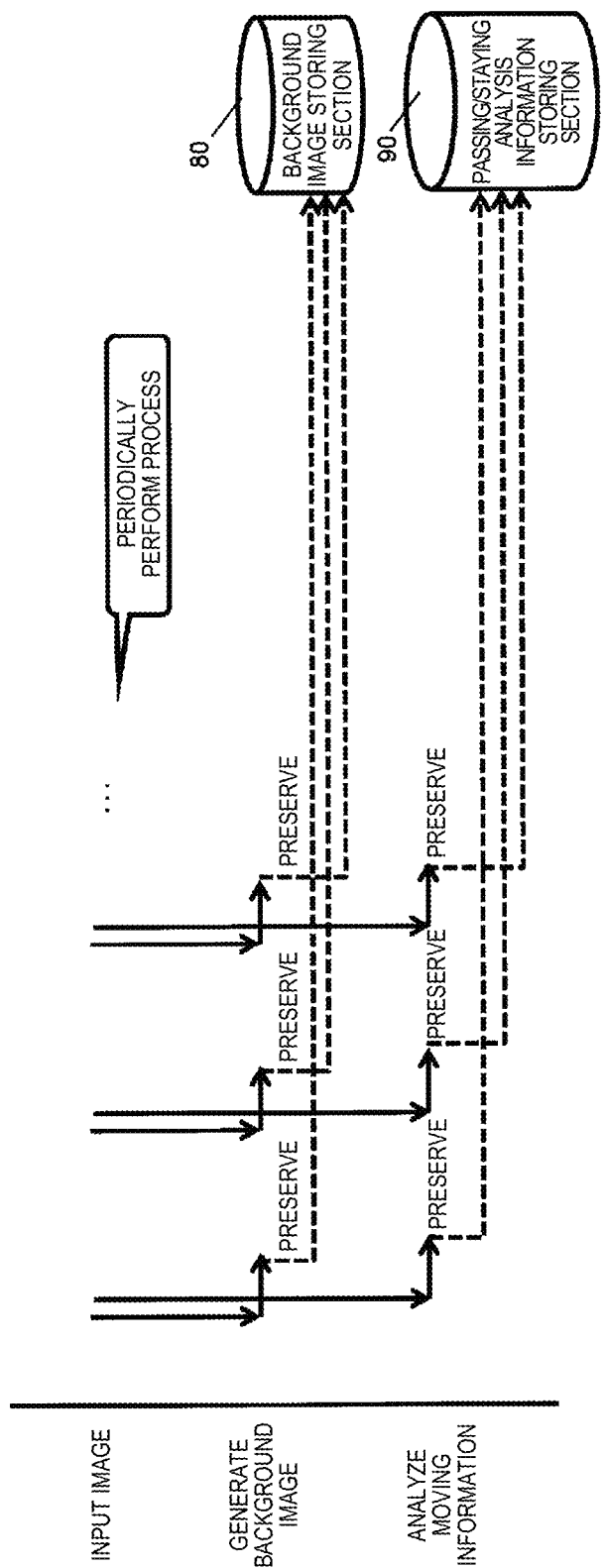
FIG. 5 is a time chart illustrating operation timings of respective processes including image input, background image generation, and moving information analysis in the camera of the present exemplary embodiment.
Figure 6:
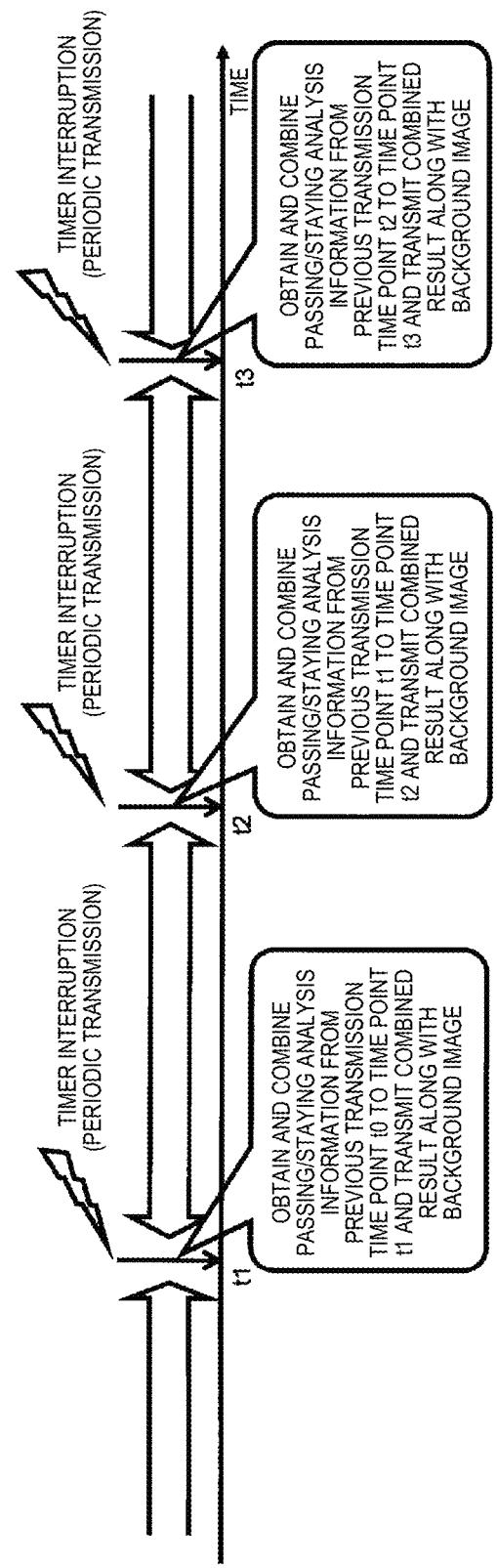
FIG. 6 is a time chart corresponding to a case where the camera of the present exemplary embodiment periodically performs a transmission process.
Figure 7:
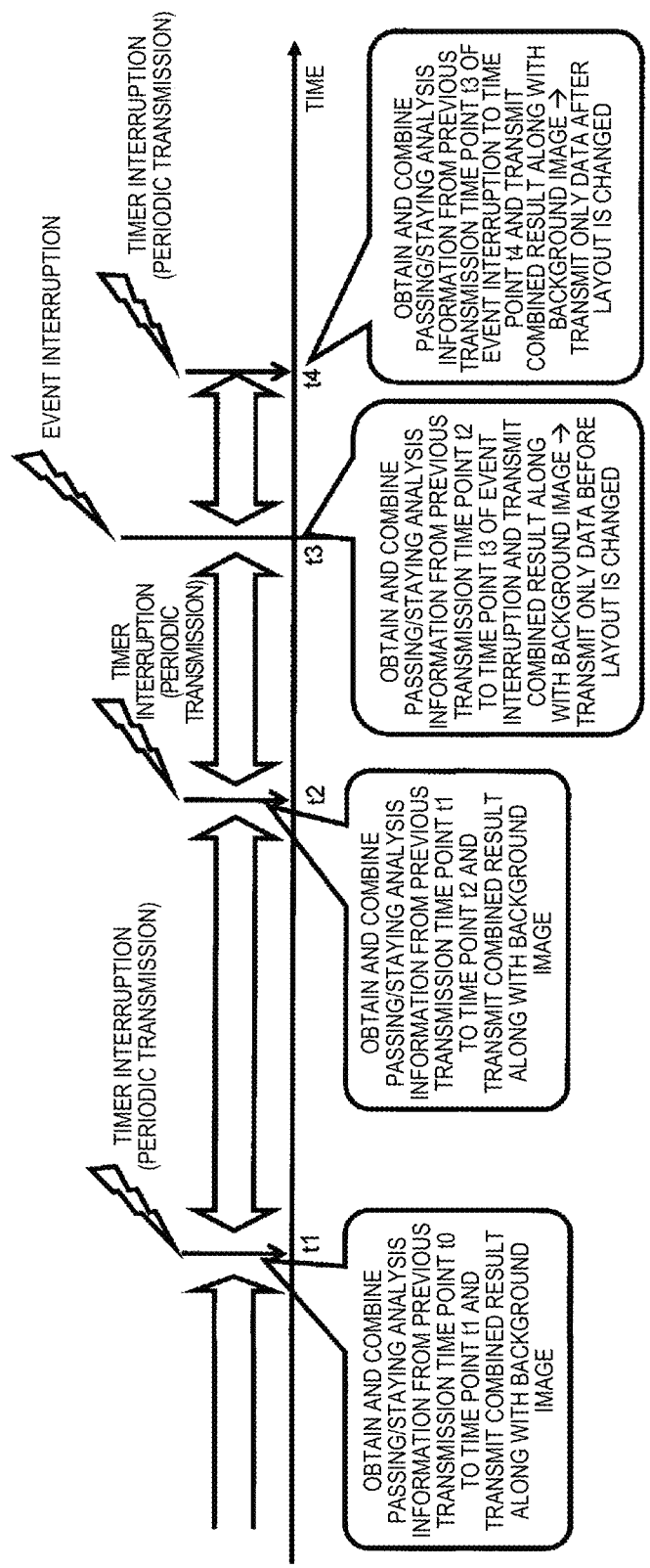
FIG. 7 is a time chart corresponding to a case where the camera of the present exemplary embodiment changes an operation timing of the transmission process in response to detection of an event.
Figure 8:
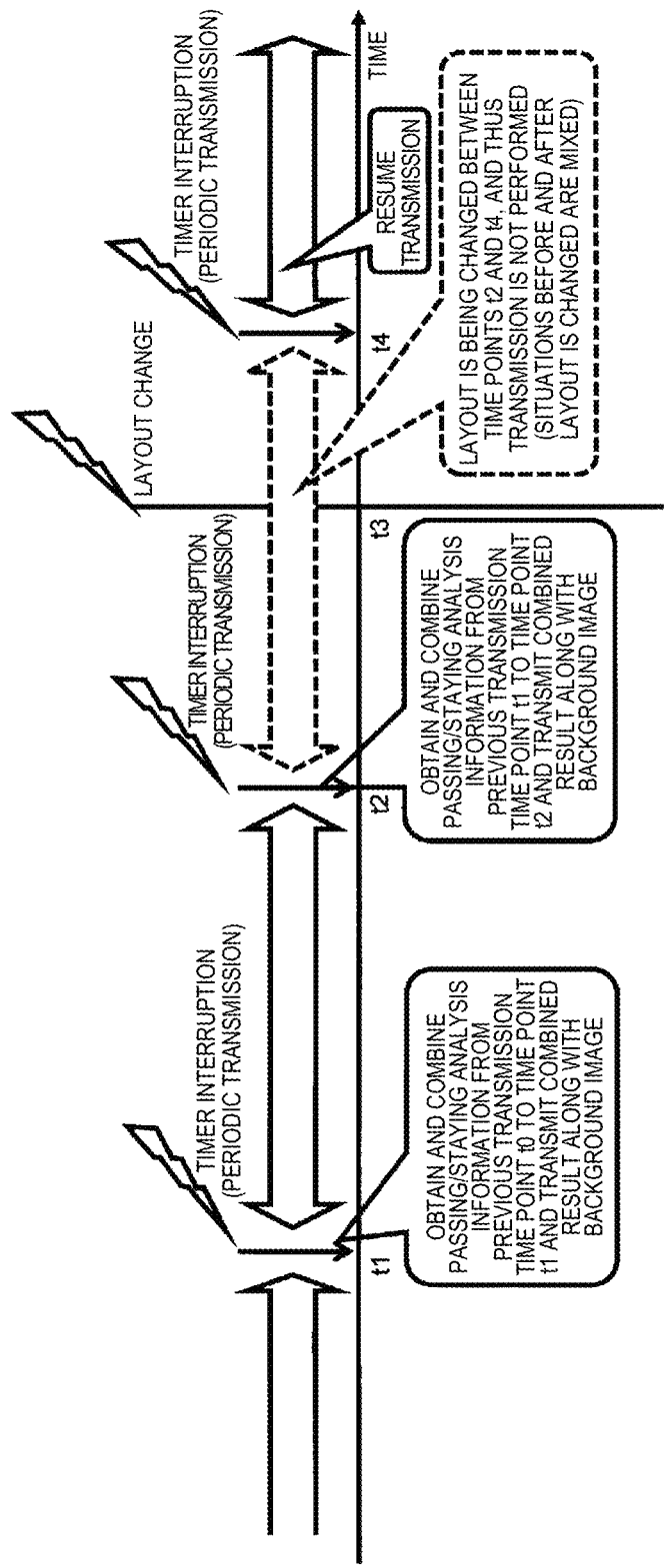
FIG. 8 is a time chart corresponding to a case where the camera of the present exemplary embodiment omits the transmission process before and after an event is detected.

Next, with reference to FIGS. 5 to 8, a description will be made of a process of transmitting data from camera 100 to server 300. FIG. 5 is a time chart illustrating operation timings of a transmission process in camera 100 of the present exemplary embodiment. FIG. 6 is a time chart corresponding to a case where camera 100 of the present exemplary embodiment periodically performs the transmission process. FIG. 7 is a time chart corresponding to a case where camera 100 of the present exemplary embodiment changes an operation timing of the transmission process in response to detection of an event. FIG. 8 is a time chart corresponding to a case where camera 100 of the present exemplary embodiment omits the transmission process before and after an event is detected.

In FIG. 5, in camera 100, if a captured image is output from image input section 20 (image input), background image generating section 30 generates a background image of the captured image output from image input section 20 (background image generation) and preserves the background image in background image storing section 80, and moving information analyzing section 40 extracts moving information regarding a staying position or a passing position of a moving object (for example, a person) included in the captured image output from image input section 20 (moving information analysis). The respective processes such as the image input, the background image generation, and the moving information analysis are periodically and repeatedly performed. However, if the respective processes such as the image input, the background image generation, and the moving information analysis are repeatedly performed, intervals among the respective processes may not be the same as each other.

For example, after the initial respective processes such as the image input, the background image generation, and the moving information analysis illustrated in FIG. 5 are performed, for example, as illustrated in FIG. 7, at an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t0 to present transmission time point t1, and transmits the data to server 300 (time point t1). As described above, a periodic transmission interval (transmission cycle) in transmitter 60 is 15 minutes, an hour, 12 hours, 24 hours, or the like, and an instruction therefor is given by schedule control section 50 in advance. The background image data transmitted by transmitter 60 may be data corresponding to a single background image or may be data corresponding to a plurality of background images (for example, a plurality of background images obtained at intervals of five minutes).

Next, when the second and subsequent respective processes such as the inputting of the image input, the background image generation, and the moving information analysis illustrated in FIG. 5 are performed, for example, as illustrated in FIG. 7, at an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t1 to present transmission time point t2, and transmits the data to server 300 (time point t2).

For example, as illustrated in FIG. 7, if a notification of detection of a predetermined event (for example, a change in a layout of a sales area of floor 1 of store A) is received from event information receiving section 70 (time point t3), transmitter 60 receives, for example, event interruption from event information receiving section 70, obtains the background image data preserved in background image storing section 80 and the extraction result data of the moving information regarding the staying information or the passing information of the moving object preserved in passing/staying information storing section 90 from previous transmission time point t2 to present transmission time point t3, and transmits the data to server 300 (time point t3). A transmission process in transmitter 60 may be performed by using not only the method illustrated in FIG. 7 but also either of the methods illustrated in FIGS. 6 and 8.

In FIGS. 6 to 8, description of the same content as that of the transmission process illustrated in FIG. 5 will be made briefly or omitted, and different content will be described. Specifically, in FIG. 6, even if event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 to present transmission time point t3 to server 300 (time point t3).

However, in the transmission process illustrated in FIG. 6, in a case where a predetermined event occurs from time point t2 to time point t3, since content of a captured image is updated, different background images are used together before and after the event is detected, and thus there is a possibility that the content of a moving information analysis image may not be accurate.

Therefore, in FIG. 7, if a notification of detection of a predetermined event (for example, a change in a layout of a sales area of floor 1 of store A) from event information receiving section 70 (time point t3), transmitter 60 receives, for example, event interruption from event information receiving section 70, obtains the background image data preserved in background image storing section 80 and the extraction result data of the moving information regarding the staying information or the passing information of the moving object preserved in passing/staying information storing section 90 from previous transmission time point t2 to present transmission time point t3 at which the event interruption is received, and transmits the data to server 300 (time point t3). At an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t3 at which the event interruption is received to present transmission time point t4, and transmits the data to server 300 (time point t4).

In FIG. 8, even if event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 to present transmission time point t3 at which the event interruption is received to server 300 (time point t3). At an end point of a transmission cycle for which an instruction is given by schedule control section 50, transmitter 60 receives, for example, timer interruption from schedule control section 50, and does not transmit the background image data preserved in background image storing section 80 and the extraction result data of the moving information regarding the staying information or the passing information of the moving object preserved in passing/staying information storing section 90 from previous transmission time point t3 at which the event interruption is received to present transmission time point t4, and transmits the data to server 300 (time point t4).

In other words, in a case where the event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 up to a start point (t4 in FIG. 8) of a transmission cycle after the event interruption is received, to server 300 (from time point t2 to time point t4).

In FIG. 8, for example, if timer interruption is received from schedule control section 50 (time point t4), transmitter 60 resumes transmission of the background image data preserved in background image storing section 80 and the extraction result data of the moving information regarding the staying information or the passing information of the moving object preserved in passing/staying information storing section 90 to server 300. Specifically, although not illustrated in FIG. 8, at an end point of a transmission cycle for which an instruction is given by schedule control section 50 after time point t4, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from time point t4 to the present transmission time point, and transmits the data to server 300.

Figure 9:
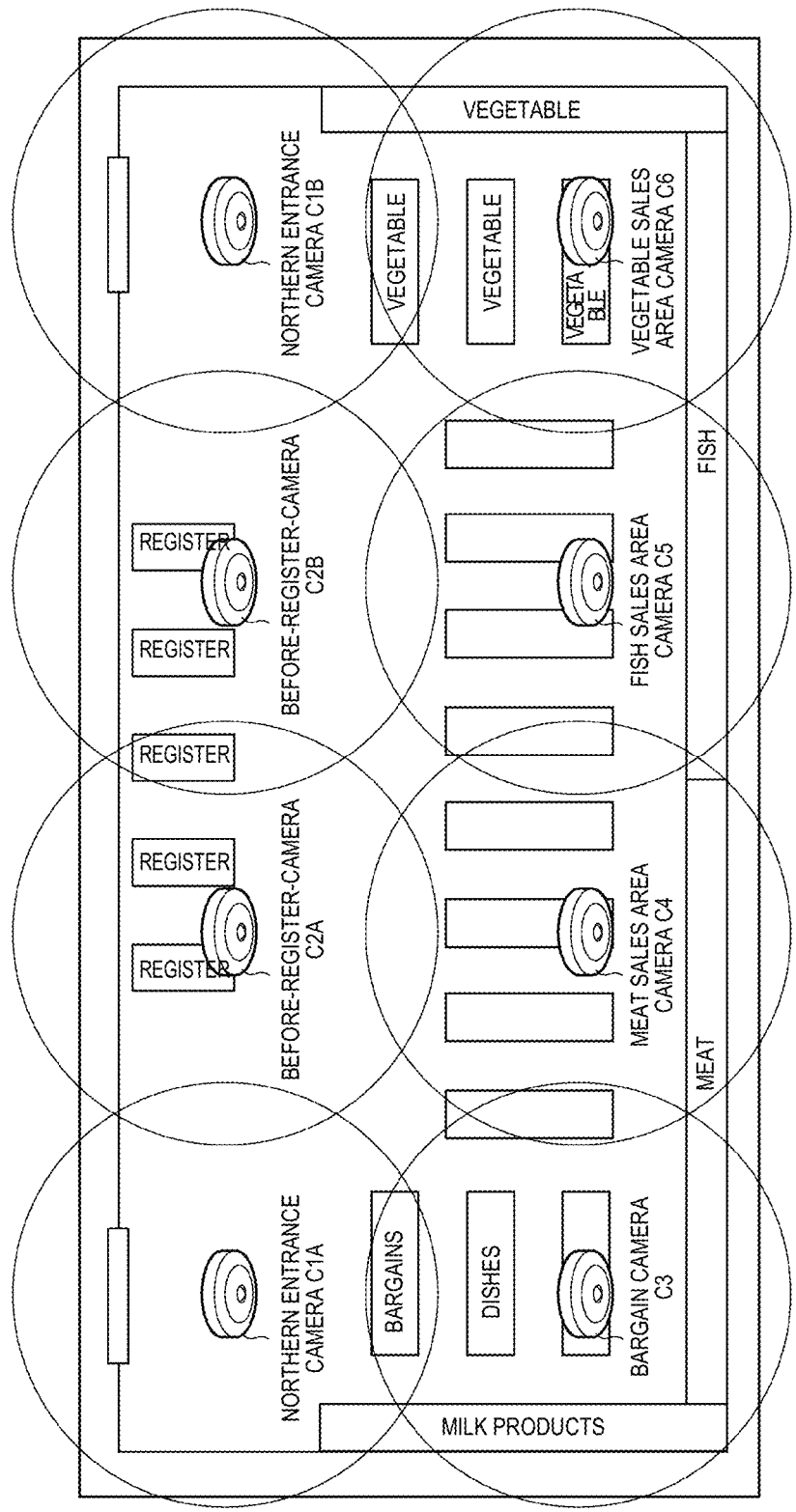
FIG. 9 is a diagram illustrating an example of a layout of a food sales area in which the camera of the present exemplary embodiment is provided in a plurality.

FIG. 9 is a diagram illustrating an example of a layout of a food sales area where camera 100 of the present exemplary embodiment is provided in plurality. FIG. 9 illustrates a state in which, for example, in the food sales area of floor 1 (1F) of store A, a plurality of (for example, eight) cameras are provided on a ceiling surface of floor 1. Specifically, a total of eight cameras (for example, omnidirectional cameras) including northern entrance cameras C1A and C1B, before-register-cameras C2A and C2B, bargain camera C3, meat sales area camera C4, fish sales area camera C5, and vegetable sales area camera C6 are provided. The type of camera is not limited to the omnidirectional camera, and may be a fixed camera in which a fixed angle of view is set, or may be a PTZ (pan, tilt, and zoom) camera having a panning function, a tilting function, and a zooming function.

Figure 10:
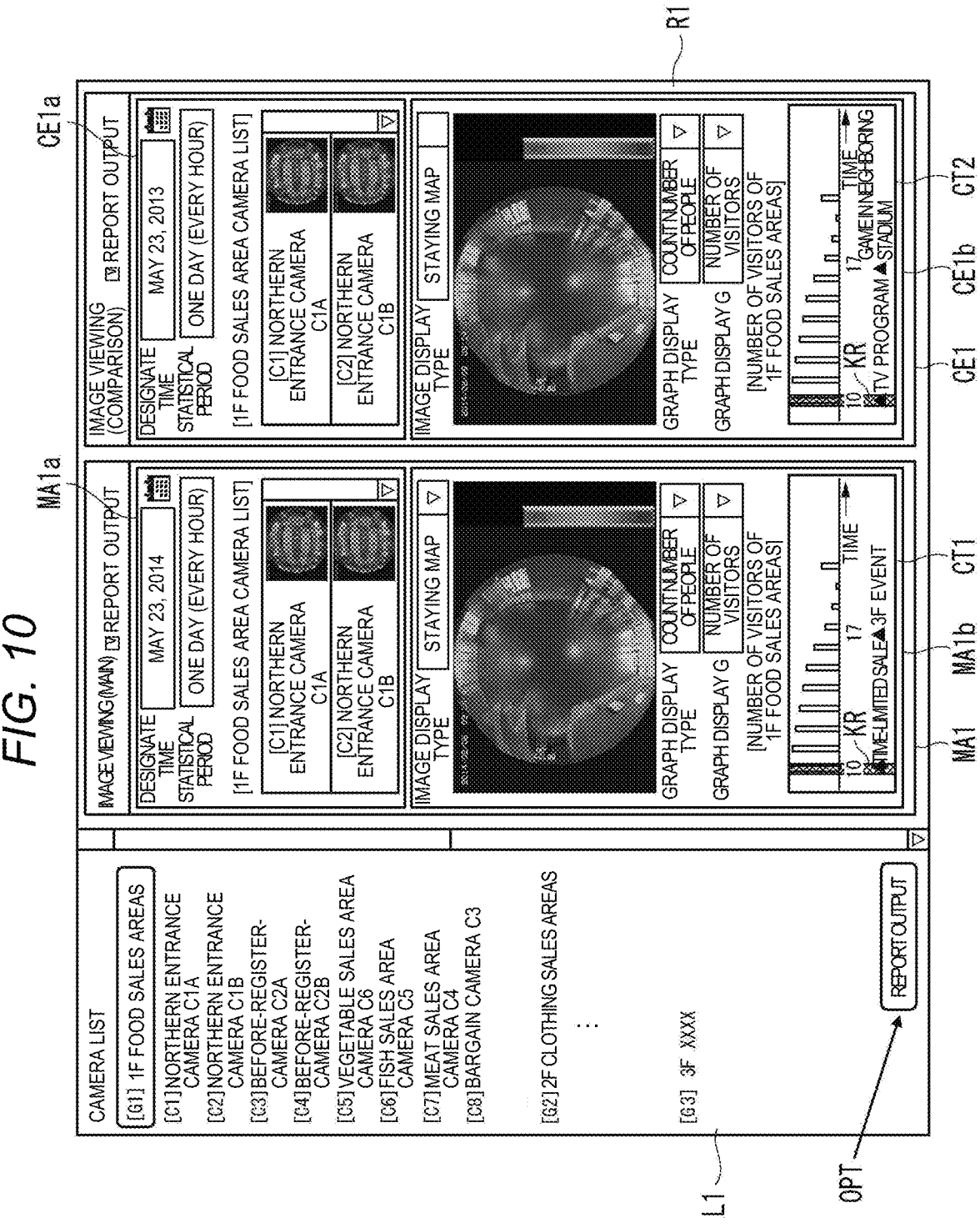
FIG. 10 is a diagram illustrating an example of an operation screen including a moving information analysis image of a store, generated by a display image generating section of the server of the present exemplary embodiment.
Figure 11:
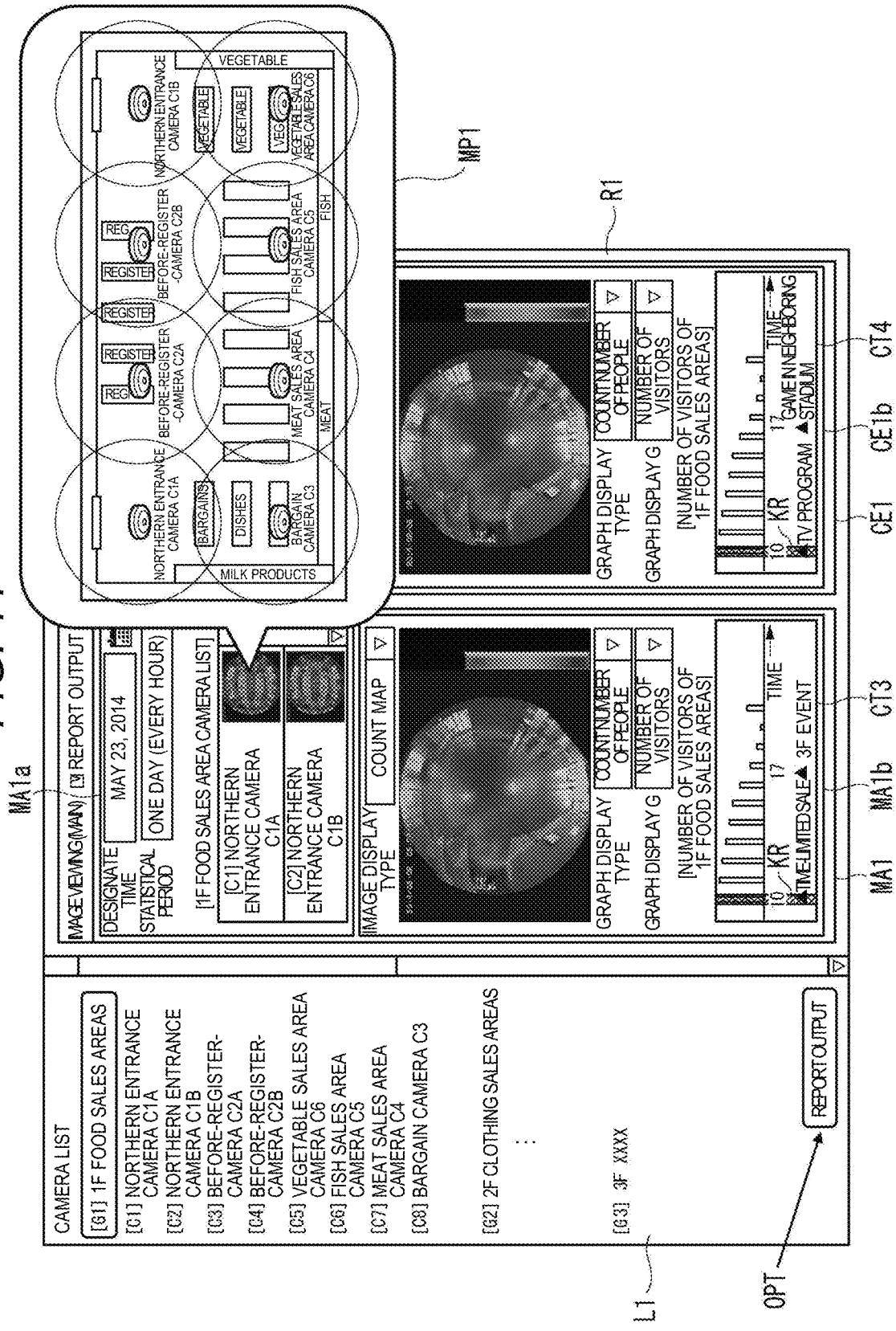
FIG. 11 is a diagram illustrating another example of an operation screen including a moving information analysis image of the store, generated by the display image generating section of the server of the present exemplary embodiment.

FIG. 10 is a diagram illustrating an example of an operation screen including a moving information analysis image of store A, generated by display image generating section 350 of server 300 of the present exemplary embodiment. FIG. 11 is a diagram illustrating another example of an operation screen including a moving information analysis image of store A, generated by display image generating section 350 of server 300 of the present exemplary embodiment. The operation screens illustrated in FIGS. 10 and 11 are displayed on monitor 450 by display image generating section 350.

On the operation screen illustrated in FIG. 10, a list of screens for selecting the cameras provided in the store is hierarchically shown in left display region L1. For example, in the food sales area (identification number: G1) of floor 1 (1F), northern entrance camera C1A (identification number: C1), northern entrance camera C1B (identification number: C2), before-register-camera C2A (identification number: C3), before-register-camera C2B (identification number: C4), vegetable sales area camera C6 (identification number: C5), fish sales area camera C5 (identification number: C6), meat sales area camera C4 (identification number: C7), and bargain camera C3 (identification number: C8) are shown hierarchically. This is also the same for a clothing sales area of floor 2 (2F) and other sales areas, and thus description thereof will be omitted.

On the operation screen illustrated in FIG. 10, display region MA1 of main (for example, present) moving information analysis information and display region CE1 of subsidiary (for example, comparison) moving information analysis information are displayed in right display region R1.

In display region MA1 of moving information analysis information, a designated condition display region MA1a including a designated time (including the date) at which server 300 generates a viewing object moving information analysis image, a statistical period indicating, for example, the unit of half a day, the unit of a day, the unit of one week, or the unit of one month, and a screen for selecting the cameras of each sales area selected in display region L1, and moving information analysis result display region MA1b including an image display type of a moving information analysis image, a graph display type, a graph display G (group), and display region CT1 of the number of visitors of each sales area, are displayed.

The image display type of a moving information analysis image includes a staying map, illustrated in FIG. 10, in which staying information of a moving object (for example, a person) is shown, a count map, illustrated in FIG. 11, in which passing information of a moving object (for example, a person) is shown, and captured images thereof. The number of moving objects (for example, persons) detected by people counting section CT in time series (for example, every hour in FIGS. 10 and 11) is shown in display region CT1 of the number of visitors of each sales area. For example, if input device 400 shifts selection bar KR displayed in display region CT1 of the number of visitors of each sales area in the time direction through a user's input operation, display image generating section 350 sequentially displays moving information analysis images which are generated at time points indicated by selection bar KR.

As illustrated in FIG. 11, instead of the screen for selecting the cameras of each sales area in display region MA1 of moving information analysis information, an example of layout MP1 in which the plurality of cameras illustrated in FIG. 9 are provided in each sales area may be displayed.

Similarly, on display region CE1 of subsidiary moving information analysis information, a designated condition display region CE1a including a designated time (including the date) at which server 300 generates a viewing object moving information analysis image as display region MA1 of main moving information analysis information, a statistical period indicating, for example, the unit of half a day, the unit of a day, the unit of one week, or the unit of one month, and a screen for selecting the cameras of each sales area selected in display region MA1 of main moving information analysis information, and moving information analysis result display region CE1b including an image display type of a moving information analysis image, a graph display type, a graph display G (group), and display region CT2 of the number of visitors of each sales area, are displayed. In a case of using display region CE1 of subsidiary moving information analysis information, for example, not only comparison between states before and after a layout in the store is changed but also usage such as comparison between states before and after a discount seal is attached to merchandise, comparison between states before and after a time-limited sale is performed, comparison between a date and the same date in the previous year, and comparison between stores (for example, and comparison between a meat sales area of store A and a meat sales area of the store B) may be included.

The number of moving objects (for example, persons) detected by people counting section CT in a time series (for example, every hour in FIGS. 10 and 11) is shown in display region CT2 of the number of visitors of each sales area. For example, if input device 400 shifts selection bar KR displayed in display region CT2 of the number of visitors of each sales area in the time direction through a user's input operation, display image generating section 350 sequentially reproduces and displays moving information analysis images which are generated at time points indicated by selection bar KR.

Input device 400 can designate a specific time zone on the time axis and can input a comment (for example, a time-limited sale, a 3F event, a TV program, and a game in a neighboring stadium), through a user's input operation, to display region CT1 of the number of visitors of each sales area of display region MA1 of main (for example, present) moving information analysis information and display region CT2 of the number of visitors of each sales area of display region CE1 of subsidiary (for example, comparison) moving information analysis information.

In FIG. 11, the remaining content is the same as that described with reference to FIG. 10 except that the image display type is a count map, and thus detailed description thereof will be omitted. In the same manner as in FIG. 10, also in FIG. 11, for example, if input device 400 shifts selection bar KR displayed in each of display regions CT3 and CT4 of the number of visitors of each sales area in the time direction through a user's input operation, display image generating section 350 sequentially reproduces and displays moving information analysis images which are generated at time points indicated by selection bar KR.

FIG. 12 is a diagram illustrating an example of operation screen RPT of a monthly report related to a food sales area of store A, dated in May, 2014, generated by report generating output section 360 of server 300 of the present exemplary embodiment. The monthly report (refer to FIG. 12) as an example of a moving information analysis report of the present exemplary embodiment is a screen which is generated by report generating output section 360 and is displayed on monitor 450 when report output button OPT provided on the lower part of left display region L1 of the operation screen illustrated in FIG. 10 or FIG. 11 is pressed via input device 400. Report generating output section 360 of server 300 may output the monthly report illustrated in FIG. 12 or partial information thereof (for example, a monthly report of a meat sales area among the food sales areas) from a printer (not illustrated) provided in store A. Consequently, a salesperson in store A can receive the printed and distributed monthly report of, for example, all the food sales areas or the meat sales area as a part thereof, in the form of a moving information analysis image in which a visitor is not shown being output.

The operation screen RPT of the monthly report (the moving information analysis report) illustrated in FIG. 12 shows various information pieces including a title of the monthly report, information regarding an atmospheric temperature, display region SR1 related to sales information, display region CR1 related to statistical information such as the number of visitors of a store (for example, store A), display regions of moving information analysis images HM5 and HM6 generated by display image generating section 350 before and after a layout of the sales area is changed as an example of a predetermined event, and display regions CT5 and CT6 of the number of visitors of each sales area. The various information pieces regarding the title of the monthly report, the information regarding the atmospheric temperature, the sales information, the event information, the information regarding a configuration of the visitors, and the like are transmitted, for example, from server 600 of the operation center to a server (for example, server 300) of a corresponding store (for example, store A). The various information pieces regarding the title of the monthly report, the information regarding the atmospheric temperature, the sales information, the event information, the information regarding a configuration of the visitors, and the like may be stored in server 300 or a storing section (not illustrated) of the store in advance.

Also in the operation screen RPT of the monthly report illustrated in FIG. 12, in the same manner as in FIG. 10 or FIG. 11, for example, if input device 400 shifts selection bar KR displayed in each of display regions CT5 and CT6 of the number of visitors of each sales area in the time direction through a user's input operation, display image generating section 350 sequentially displays moving information analysis images which are generated at time points indicated by selection bar KR.

As mentioned above, in moving information analyzing system 500A of the present exemplary embodiment, camera 100 generates a background image of a captured image of a predetermined imaging region, extracts moving information regarding a staying position or a passing position in the imaging region of a moving object (for example, a person) included in the captured image, and transmits the background image of the captured image and the moving information of the moving object to server 300 at a predetermined transmission cycle. Server 300 generates a moving information analysis image in which the moving information of the moving object is superimposed on the background image of the captured image, and displays the moving information analysis image on monitor 450.

Consequently, moving information analyzing system 500A generates the background image which is a base of the moving information analysis image so that the moving object (for example, a person) is removed so as not to be shown therein, and can thus appropriately protect the privacy of the moving object (the person) shown in an imaging region when a moving information analysis image is generated. Since moving information analyzing system 500A superimposes the moving information regarding the staying position or the passing position in the imaging region of the moving object (the person) on the background image which has already been updated at a predetermined timing (for example, the time at which a periodic transmission cycle arrives), it is possible to visually display a moving information analysis image which appropriately indicates accurate moving information regarding the staying position or the passing position in the imaging region of the moving object to a user at a predefined transmission cycle in a state in which the moving object is removed from the captured image.

Since moving information analyzing system 500A gives, to schedule control section 50 of the camera, an instruction for a predetermined transmission cycle for transmitting a background image and moving information of a moving object, it is possible to periodically transmit the background image and the moving information of the moving object to server 300 according to the transmission cycle for which the instruction is given in advance.

Since moving information analyzing system 500A transmits a background image and moving information of a moving object to server 300 when receiving a notification of detection of a predetermined event (for example, an event such as a change of a layout of a sales area in a store) from event information receiving section 70, server 300 can generate a moving information analysis image in which moving information regarding staying positions or passing positions of a moving object in an imaging region before and after the time at which the predetermined event is detected is accurately reflected.

Since moving information analyzing system 500A transmits a background image and moving information of a moving object to server 300 when scene identifying section SD detects a change (for example, a change of a layout of a sales area in a store) in a captured image, server 300 can generate a moving information analysis image in which moving information regarding staying positions or passing positions of a moving object in an imaging region before and after the time at which the change in the captured image is detected is accurately reflected.

In moving information analyzing system 500A, since people counting section CT counts the number of detected moving objects included in a captured image and outputs information regarding the number of detected moving objects to transmitter 60, it is possible to display a moving information analysis image including information regarding staying positions or passing positions of a moving object in an imaging region and a display screen (operation screen) including the number of detected moving objects on monitor 450.

Since moving information analyzing system 500A does not transmit a background image and moving information of a moving object at a transmission cycle including the time at which event information receiving section 70 receives a notification of detection of a predetermined event, it is possible to prevent moving information pieces regarding staying positions or passing positions of a moving object in an imaging region before and after the predetermined event (for example, a change in a layout of a sales area in a store) is detected from being used together when server 300 generates a moving information analysis image.

In moving information analyzing system 500A, since report generating output section 360 generates a moving information analysis report including a moving information analysis image generated before detecting a predetermined event (for example, a change in a layout of a sales area in a store) and a moving information analysis image generated after detecting the same event, it is possible to show how moving information regarding a staying position or a passing position of a moving object in an imaging region changes due to the predetermined event in contrasted and easily understandable manner.

In moving information analyzing system 500A, a generated moving information analysis report is displayed on monitor 450 through a predetermined input operation (for example, a user's operation of pressing the report output button), and thus the moving information analysis report can be visually displayed to the user.

In moving information analyzing system 500A, since respective cameras 100, 100A, . . . , and 100N perform generation of a background image of a captured image and extraction of moving information regarding a staying position or a passing position of a moving object included in the captured image, and then server 300 generates and displays a moving information analysis image, a processing load on server 300 can be reduced when compared with a case where server 300 performs generation of a background image of a captured image and extraction of moving information regarding a staying position or a passing position of a moving object included in the captured image, and thus it is possible to alleviate a limitation on the number of cameras which can be connected to single server 300.

Modification Examples of Present Exemplary Embodiment

Figure 13:
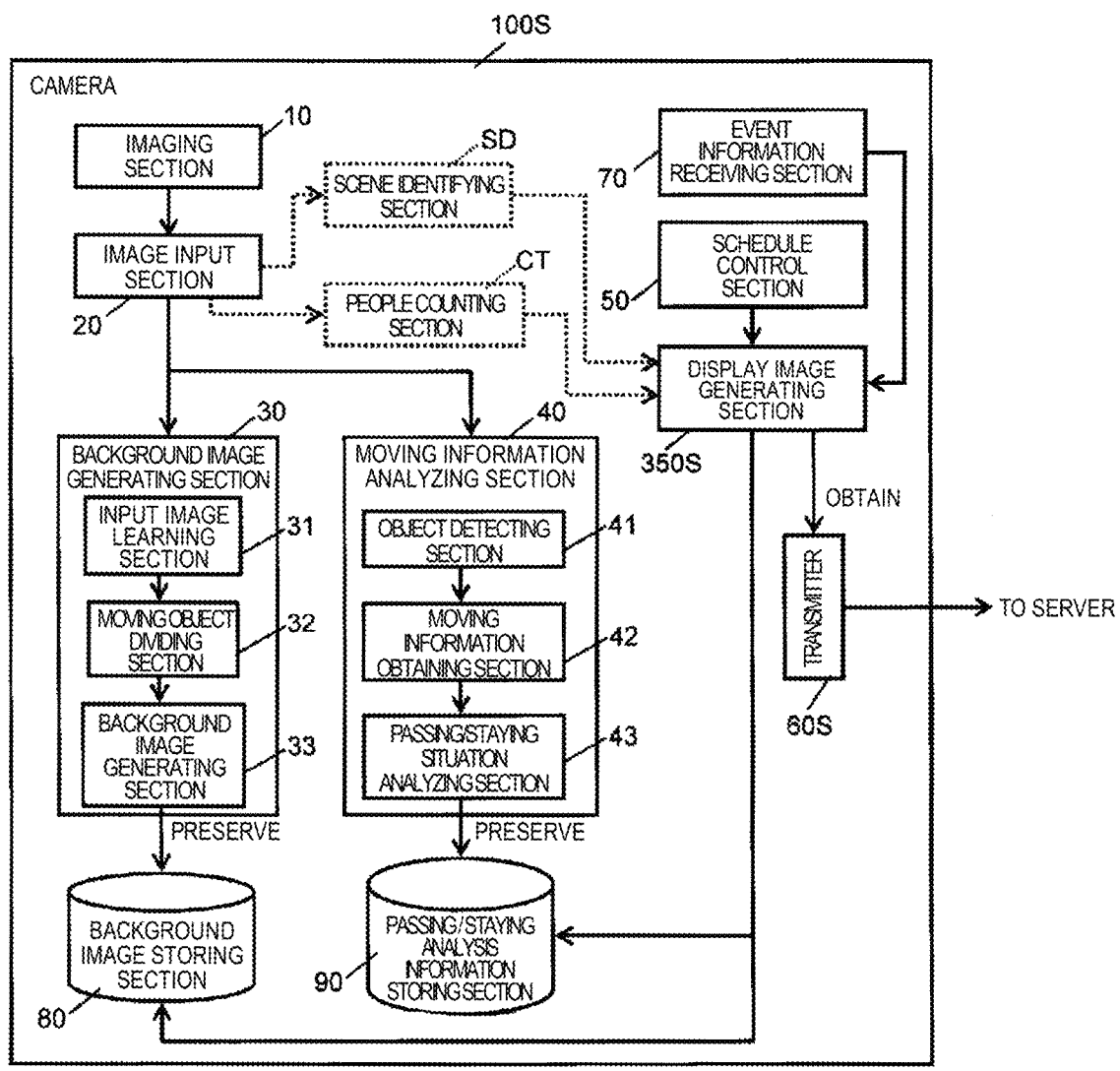
FIG. 13 is a block diagram illustrating details of a functional internal configuration of a camera of a modification example of the present exemplary embodiment.

In the above-described present exemplary embodiment, the process of generating a moving information analysis image is performed by server 300, but the process of generating a moving information analysis image may also be performed by camera 100 (refer to FIG. 13). FIG. 13 is a block diagram illustrating details of a functional internal configuration of camera 100S of a modification example of the present exemplary embodiment. Camera 100S illustrated in FIG. 13 includes imaging section 10, image input section 20, background image generating section 30, moving information analyzing section 40, schedule control section 50, transmitter 60S, event information receiving section 70, background image storing section 80, passing/staying information storing section 90, and display image generating section 350S. In description of each section of camera 100S illustrated in FIG. 13, constituent elements having the same configuration and operation as those of camera 100 illustrated in FIG. 2 are given the same reference numerals, and description thereof will be omitted, and differing content will be described.

Display image generating section 350S as an example of an image generating section generates a moving information analysis image in which moving information regarding a staying position and a passing position of a moving object is superimposed on a background image by using background image data preserved in background image storing section 80 and extraction result data of the moving information regarding the staying information or the passing information of the moving object preserved in passing/staying information storing section 90 in response to an instruction from schedule control section 50 or event information receiving section 70, and outputs the moving information analysis image to transmitter 60.

Transmitter 60S transmits data on the moving information analysis image generated by display image generating section 350S to server 300.

As described above, in the modification example of the present exemplary embodiment, camera 100S generates a background image of a captured image of a predetermined imaging region, extracts moving information regarding a staying position or a passing position in the imaging region of a moving object (for example, a person) included in the captured image, and generates a moving information analysis image in which the moving information of the moving object is superimposed on the background image of the captured image by using the background image of the captured image and the moving information of the moving object.

Consequently, camera 100S generates the background image which is a base of the moving information analysis image so that the moving object (for example, a person) is removed so as not to be shown therein, and can thus appropriately protect privacy of the moving object (the person) shown in an imaging region when a moving information analysis image is generated. Since camera 100S superimposes the moving information regarding the staying position or the passing position in the imaging region of the moving object (the person) on a captured image which is obtained in real time, it is possible to generate a moving information analysis image which appropriately indicates the latest moving information regarding the staying position or the passing position in the imaging region of the moving object in a state in which the moving object is removed from the captured image.

Since camera 100S performs a process up to a point of generating a moving information analysis image and transmits moving information analysis image data which is a result of the process to server 300, for example, server 300 may not perform the process of generating a moving information analysis image in a state in which a processing load on server 300 is considerably high, and thus it is possible to minimize an increase in the processing load on server 300.

Configuration Examples of Displaying Count Position and Count Result of Number of Moving Objects Next, as a second configuration example of the present exemplary embodiment, a description will be made of a configuration in which a count position and a count result of the number of moving objects is displayed in a moving information analysis image. In a case where moving information analysis on a person in a store is performed by using moving information analyzing system 500A, if the number of moving objects at any position such as a specific sales area in the store can be understood in a moving information analysis image, more detailed analysis can be performed. The present configuration example is an example in which a position where moving objects are counted and the number of moving objects counted at the position can be easily visually recognized in the moving information analysis image.

Figure 14:
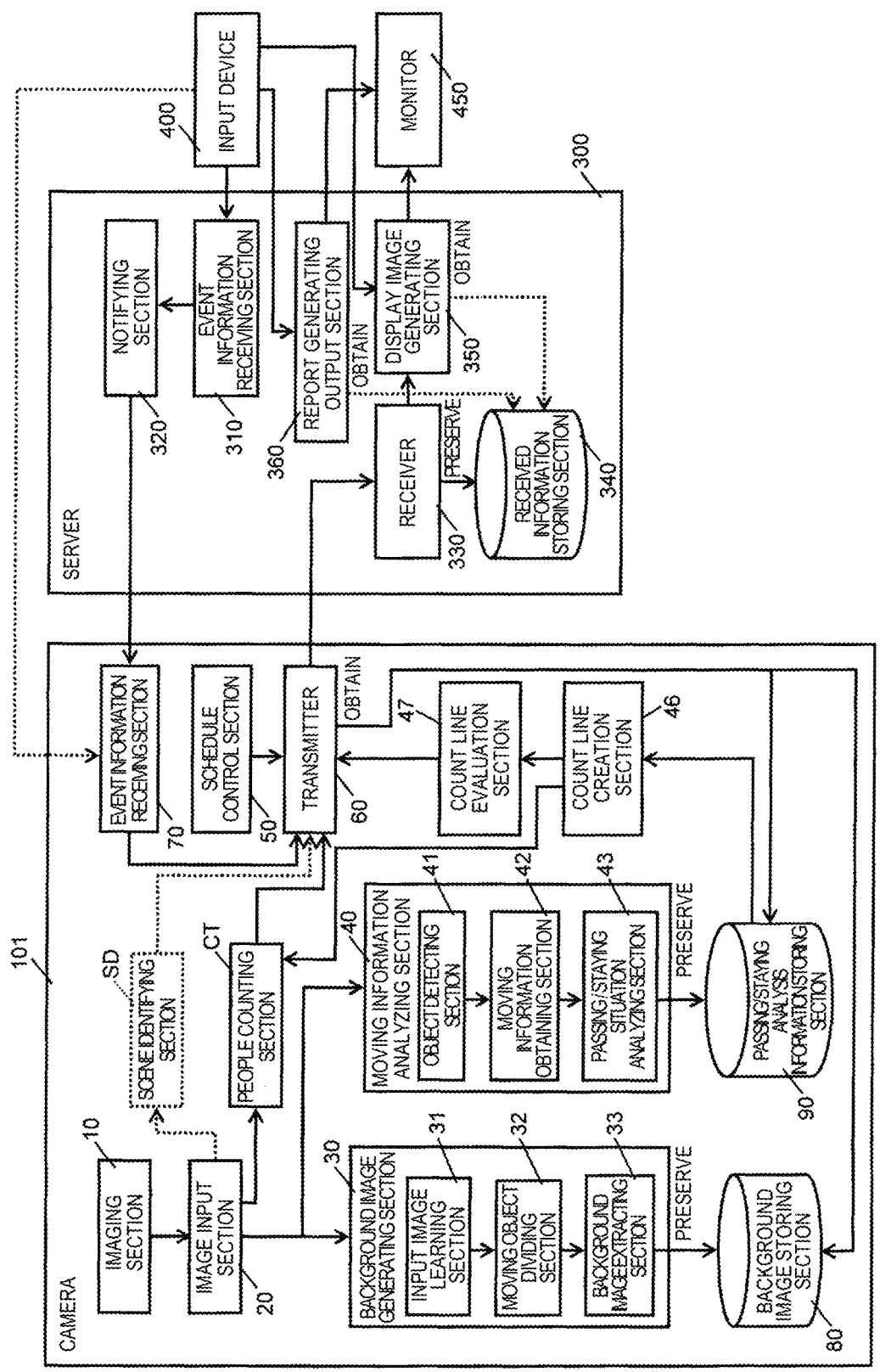
FIG. 14 is a block diagram illustrating details of a functional internal configuration of each of a camera and a server of a second configuration example of the present exemplary embodiment.

FIG. 14 is a block diagram illustrating details of a functional internal configuration of each of camera 101 and server 300 of a second configuration example of the present exemplary embodiment. In description of each section of camera 101 illustrated in FIG. 14, constituent elements having the same configuration and operation as those of camera 100 illustrated in FIG. 2 are given the same reference numerals, and description thereof will be omitted, and differing content will be described.

Camera 101 includes not only the configuration illustrated in FIG. 2 but also count line creation section 46 and count line evaluation section 47. Each of count line creation section 46 and count line evaluation section 47 is configured by using, for example, a CPU, an MPU, or a DSP, and realizes a function thereof by performing processes according to a predetermined program. Count line creation section 46 creates a count line indicating a position for counting the number of moving objects in a moving information analysis image on the basis of moving information analysis image data (extraction result data of moving information regarding staying information or passing information of a moving object) generated by moving information analyzing section 40 and an instruction from a viewer of a moving information analysis image sent from server 300. Count line evaluation section 47 calculates a line evaluation value for evaluating whether or not the count line is appropriate on the basis of the moving information analysis image data or the like, and outputs the line evaluation value to server 300 via transmitter 60. If an instruction from the viewer of the moving information analysis image based on the line evaluation value is input to event information receiving section 70 from server 300, count line creation section 46 selects a count line instructed to be selected, and outputs the selected count line to people counting section CT. People counting section CT counts the number of moving objects in the designated count line, and outputs the number of moving objects having passed the count line to server 300 via transmitter 60 as the number of moving objects in the line.

Display image generating section 350 of server 300 generates, as a moving information analysis image displaying a count line and a moving object count result, an image in which moving information is superimposed on a background image, and to which a count line and the number of moving objects are added, by using the background image obtained by removing a picture of a moving object such as a person from a captured image. The moving information analysis image (heat map image) generated by display image generating section 350 may be, for example, an image in which moving information of a moving object within an angle of view is superimposed on a background image based on a captured image within the angle of view of a single camera, and an image in which moving information of a moving object within each angle of view may be superimposed on background images within angles of view of a plurality of cameras. The moving information analysis image may be generated, instead of the background image and the moving information, by using a contour image including a moving object with only a contour or silhouette from which privacy information such as the content of a picture of a person or the like so that it is difficult to specify a person in a captured image and moving information, and may be generated by using a captured image of a moving object such as a person and moving information. A technique for generating a contour image from a captured image is a well-known technique, and is disclosed in, for example, Japanese Patent Unexamined Publication Nos. 2015-149557, 2015-149558 and 2015-149559. In a case where server 300 generates a moving information analysis image by superimposing moving information on a captured image, camera 101 may not be provided with background image generating section 30 and background image storing section 80.

Figure 15:
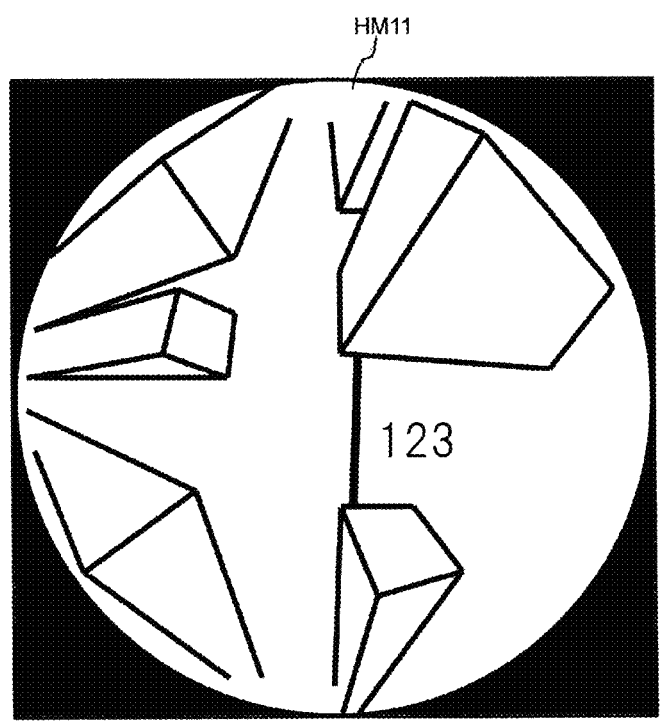
FIG. 15 is a diagram illustrating a first display example of a count line and a count result displayed in a moving information analysis image.

FIG. 15 is a diagram illustrating a first display example of a count line and a count result displayed in a moving information analysis image. In the first display example, a single count line indicating a count position and a count result "123" indicating the number of people crossing the count line are shown in moving information analysis image HM11. Moving information analysis image HM11 shows that 123 people have passed the count line set in the image.

Figure 16:
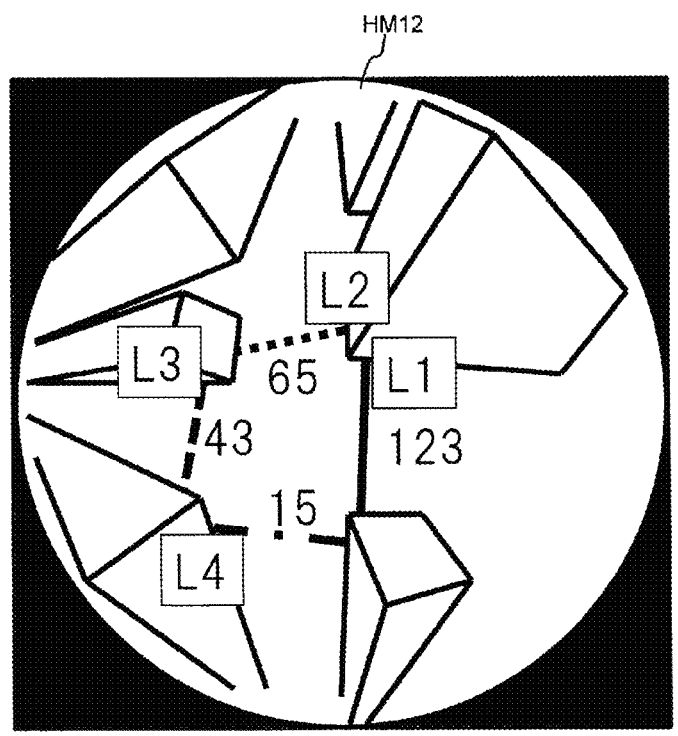
FIG. 16 is a diagram illustrating a second display example of a count line and a count result displayed in a moving information analysis image.

FIG. 16 is a diagram illustrating a second display example of a count line and a count result displayed in a moving information analysis image. In the second display example, four count lines L1, L2, L3 and L4 as a plurality of count lines indicating count positions, and count results "L1=123", "L2=65", "L3=43", and "L4=15" indicating the number of line passing people having crossed the respective count lines are shown in moving information analysis image HM12. Moving information analysis image HM12 shows that 123 people have passed count line L1 set in the image, 65 people have passed count line L2, 43 people have passed count line L3, and 15 people have passed count line L4. In a case where a plurality of count lines L1, L2, . . . are displayed, display image generating section 350 generates images the count lines by causing, for example, colors, line types, or patterns of the respective count lines to be different from each other, and displays the count lines in moving information analysis image HM12. Display image generating section 350 displays count results respectively corresponding to the plurality of count lines in the vicinities of the respective count lines.

Figure 17:
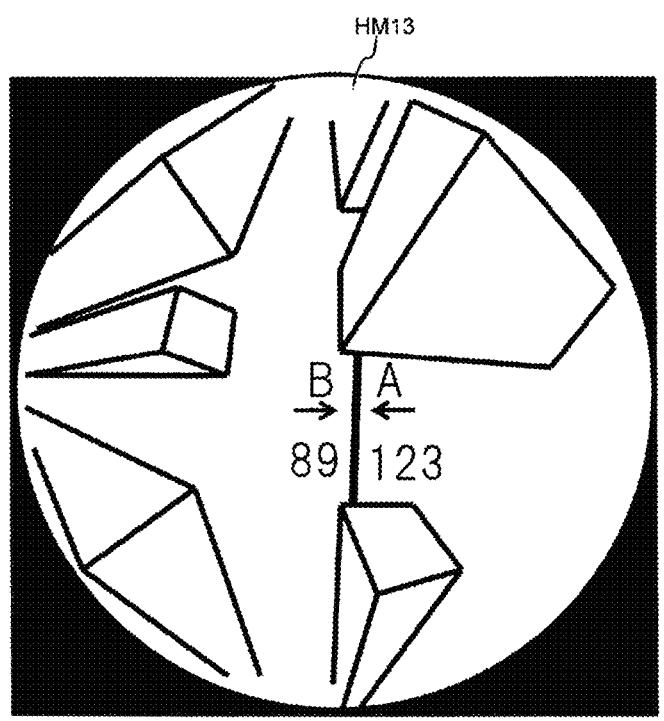
FIG. 17 is a diagram illustrating a third display example of a count line and a count result displayed in a moving information analysis image.

FIG. 17 is a diagram illustrating a third display example of a count line and a count result displayed in a moving information analysis image. In the third display example, a single count line indicating a count position, and a count result "123" indicating the number of people having crossed the count line from an A direction (a direction from the right to the left in FIG. 17), and a count result "89" indicating the number of people having crossed the count line from a B direction (a direction from the left to the right in FIG. 17) are shown in moving information analysis image HM13. In the third display example, the number of moving objects from both directions is counted for each direction with respect to the count line set in the image, and the directions from which moving objects have passed and the direction-basis count results are displayed. Moving information analysis image HM13 shows that 123 people have passed the count line from one A direction, and 89 people have passed the count line from the opposite B direction, on the basis of both of the passing directions.

Figure 18:
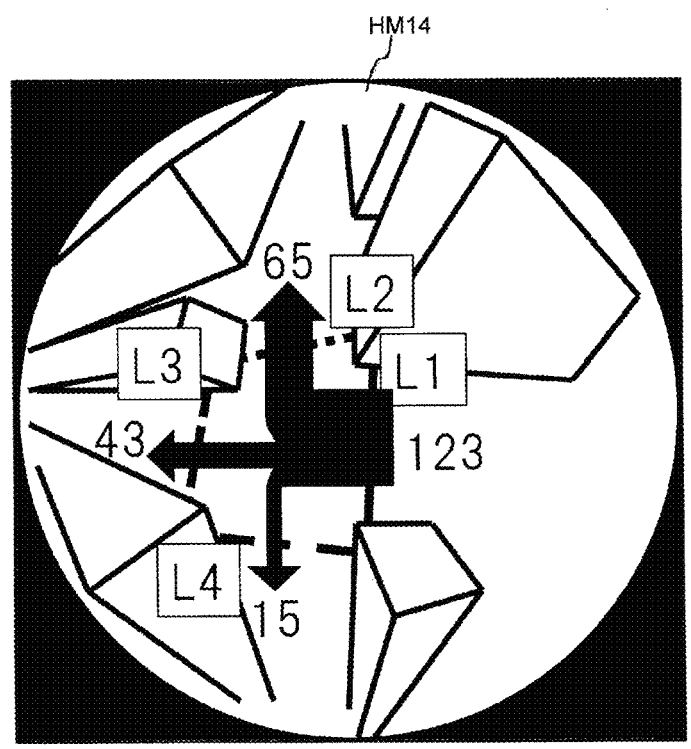
FIG. 18 is a diagram illustrating a fourth display example of a count line and a count result displayed in a moving information analysis image.

FIG. 18 is a diagram illustrating a fourth display example of a count line and a count result displayed in a moving information analysis image. In the fourth display example, four count lines L1, L2, L3 and L4 indicating count positions, count results "L1=123", "L2=65", "L3=43", and "L4=15" indicating the number of line passing people having crossed the respective count lines, and arrows having different thicknesses according to the number of moving objects are shown in moving information analysis image HM14. In the fourth display example, multiple numbers of moving objects having passed two or more count lines are counted as count results with respect to the plurality of count lines set in the image, and the count results of the multiple numbers of moving objects corresponding to respective combinations of the plurality of count lines are displayed. Moving information analysis image HM14 shows that 123 people have passed count line L1, and then 65 people have passed count line L2, 43 people have passed count line L3, and 15 people have passed count line L4. According to this display example, it is possible to understand the number of passing people combined with a plurality of count lines, and also to understand the number of passing people for each path of moving information. It is possible to intuitively understand the magnitude of the number of passing people from the thicknesses of the arrows.

Figure 19:
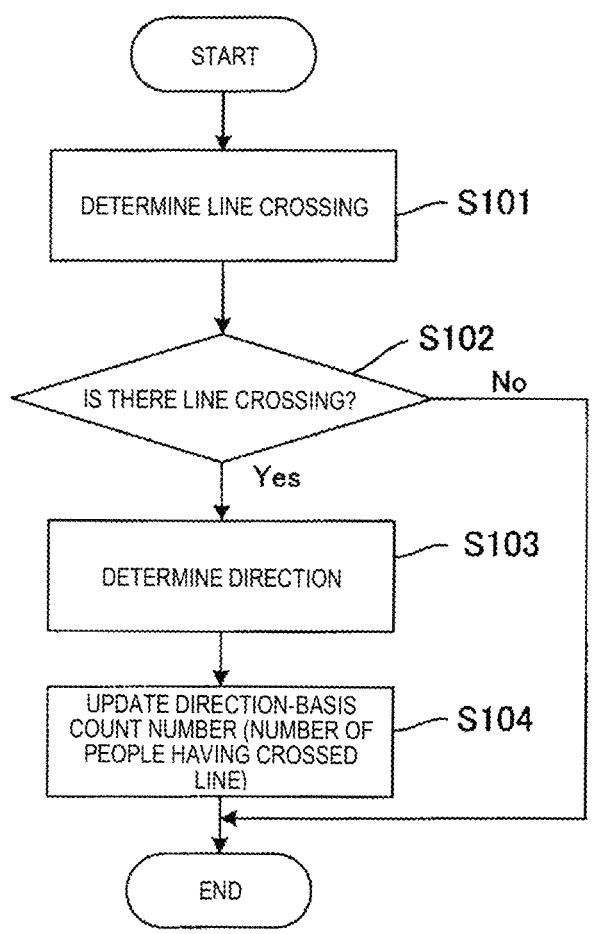
FIG. 19 is a flowchart illustrating procedures of a process of counting a direction-basis number of moving objects passing a count line.

FIG. 19 is a flowchart illustrating procedures of a process of counting a direction-basis number of moving objects having passed a count line. People counting section CT of camera 101 performs the process of counting the number of moving objects illustrated in FIG. 19 for each count line. The flowchart illustrated in FIG. 19 corresponds to the third display example representing a direction-basis count result of moving objects illustrated in FIG. 17. People counting section CT determines that a moving object has crossed and passed the set count line (step S101). The line crossing determination may determine whether or not a moving object has crossed the count line by using coordinates of a movement trajectory of the moving object on the basis of processing results of moving object detection and moving object tracking. Here, people counting section CT determines whether or not the moving object has crossed the count line (step S102), and determines a direction of having crossed the count line if there is line crossing (step S103). Next, people counting section CT updates (increments by one) a direction-basis count number of moving objects (the number of moving objects having crossed the line) (step S104). People counting section CT outputs the direction-basis count number of moving objects to server 300 via transmitter 60. Server 300 adds the count result (passing number) corresponding to the count line to a moving information analysis image which is then displayed on monitor 450.

Figure 20:
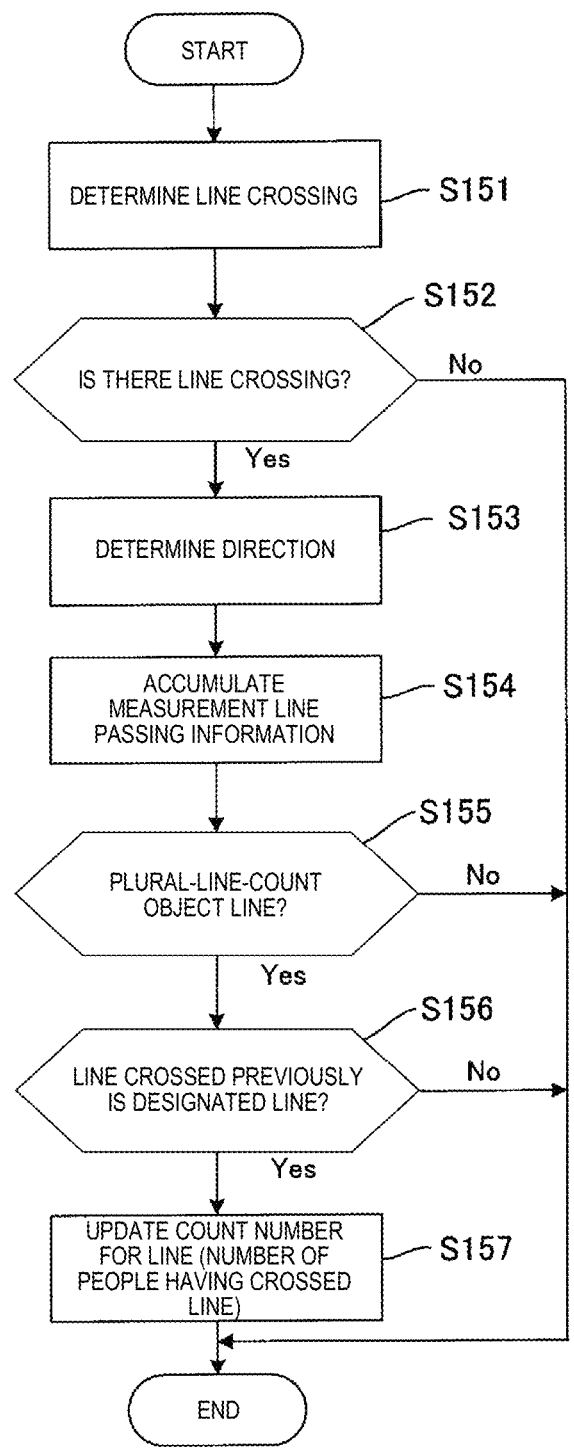
FIG. 20 is a flowchart illustrating procedures of a process of counting the number of moving objects passing a plurality of count lines.

FIG. 20 is a flowchart illustrating procedures of a process of counting the number of moving objects having passed a plurality of count lines. People counting section CT of camera 101 performs the process of counting the number of moving objects illustrated in FIG. 20 with respect to a plurality of (for example, two) count lines by the number of count lines. The flowchart illustrated in FIG. 20 corresponds to the fourth display example representing count results of moving objects in a plurality of count lines illustrated in FIG. 18. People counting section CT determines that a moving object has crossed and passed the set count line (step S151). Here, people counting section CT determines whether or not a moving object has crossed the line (step S152), and determines a direction of having crossed the count line if there is line crossing (step S153). People counting section CT accumulates count line passing information (step S154). Here, people counting section CT accumulates ID information of the count line such as a line number and a passing number as the passing information indicating which count line a moving object has crossed.

Next, people counting section CT determines whether or not the count line is a plural-line-count object line for counting the number of moving objects crossing a plurality of count lines (step S155), and determines whether or not the count line crossed by a moving object previously is a designated line if the count line is the plural-line-count object line (step S156). Regarding setting of count lines, in the display example illustrated in FIG. 18, for example, the plural-line-count object lines are set to L2, L3, and L4, and the designated line is set to L1. In this case, in a case where a count line crossed by a moving object this time is any one of L2, L3, and L4 (plural-line-count object line), and a count line crossed by the moving object previously is L1 (designated line), determination results in steps S155 and S156 are all affirmative (Yes). In a case where the count line crossed previously is the designated line in step S156, the count number (the number of people having crossed the lines) of moving objects for a plurality of corresponding count lines (the plural-line-count object line and the designated line) is updated (incremented by one) (step S157). People counting section CT outputs the count number of moving objects for a plurality of count lines to server 300 via transmitter 60. Server 300 adds the count result corresponding to the count line to a moving information analysis image which is then displayed on monitor 450. In the display example illustrated in FIG. 18, along with a count line-basis passing number, the arrows having different thicknesses according to the number of moving objects having passed each count line are generated and displayed.

Figure 21A:
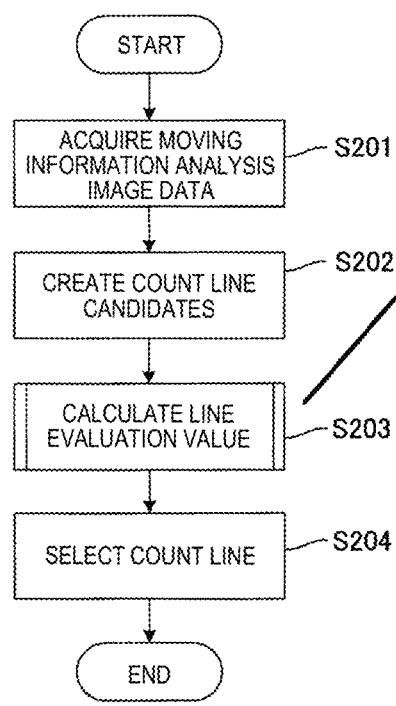
FIG. 21A is a flowchart illustrating procedures of a process of selecting a count line, and is a flowchart illustrating procedures of a process from creation of count line candidates to line selection.
Figure 21B:
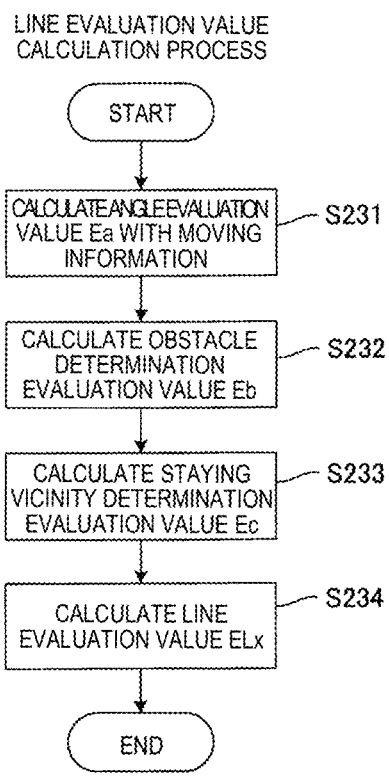
FIG. 21B is a flowchart illustrating procedures of a process of selecting a count line, and is a flowchart illustrating procedures of a line evaluation value calculation process.

FIG. 21A is a flowchart illustrating procedures of a process of selecting a count line, and is a flowchart illustrating procedures of a process from creation of count line candidates to line selection, and FIG. 21B is a flowchart illustrating procedures of the line evaluation value calculation process. Count line creation section 46 of camera 101 acquires moving information analysis image data (extraction result data of moving information regarding staying information or passing information of a moving object) which is generated by moving information analyzing section 40 and is preserved in passing/staying information storing section 90 (step S201). Count line creation section 46 creates one or a plurality of count line candidates as a candidate of a count line (step S202). The count line candidates may be created in response to an instruction which is input from a viewer of a moving information analysis image, and may be created as appropriate by count line creation section 46 on the basis of moving information analysis image data. Next, count line evaluation section 47 of camera 101 calculates line evaluation values for the created count line candidates (step S203).

In the line evaluation value calculation process, first, count line evaluation section 47 calculates angle evaluation value Ea with moving information (step S231). If a count line is set to be perpendicular to moving information along which a person or the like moves, the number of moving objects can be more accurately counted, and thus the propriety of a count line is evaluated on the basis of an angle with moving information. Angle evaluation value Ea with moving information is calculated according to the following Equation (1) when an angle with moving information is indicated by Ang (0≤Ang≤90 degrees). The angle Ang is obtained on the basis of the acquired moving information analysis image data. Angle evaluation value Ea with moving information is greatest in a case where a count line is perpendicular to moving information (Ang=90 degrees).

$$Ea = K*\text{Ang} \tag{1}$$

K: Coefficient

Second, count line evaluation section 47 calculates obstacle determination evaluation value Eb (step S232). If a count line lies across an obstacle (a portion through which a person or the like does not pass), an unintended moving object or noise may be counted, and thus the propriety of a count line is evaluated on the basis of a state of overlapping an obstacle. Obstacle determination evaluation value Eb is calculated according to the following Equation (2) when a rate of a count line overlapping an obstacle in terms of a line length is indicated by CRate (0≤CRate≤100). Rate CRate of overlapping an obstacle is obtained on the basis of the acquired moving information analysis image data. Obstacle determination evaluation value Eb is greatest in a case where a count line does not overlap an obstacle (CRate=0).

$$Eb = M*(100 - C\text{Rate}) \tag{2}$$

M: Coefficient

Third, count line evaluation section 47 calculates staying vicinity determination evaluation value Ec (step S233). If a count line is set in a location at which a person or the like stays, a line boundary is heavy in comings and goings of persons, and thus the number of moving objects cannot be accurately counted. Therefore, the propriety of a count line is evaluated on the basis of the extent of being close to a staying location. Staying vicinity determination evaluation value Ec is calculated according to the following Equation (3) when a distance from a staying location to a count line is indicated by Dist (0≤Dist≤100). Distance Dist from a staying location is obtained on the basis of the acquired moving information analysis image data. Staying vicinity determination evaluation value Ec is greatest in a case where a distance between a count line and a staying location is long (Dist=100).

$$Ec = N*\text{Dist} \tag{3}$$

N: Coefficient

Count line evaluation section 47 calculates line evaluation value ELx by using angle evaluation value Ea with moving information with moving information, obstacle determination evaluation value Eb, and staying vicinity determination evaluation value Ec (step S234). Line evaluation value ELx is calculated according to the following Equation (4).

$$ELx = \alpha Ea + \beta Eb + \gamma Ec \tag{4}$$

Here, α, β, and γ are weighting factors of the respective evaluation values.

Count line evaluation section 47 presents the extent of recommendation according to line evaluation value ELx (where x is the number of measurement lines; one, two, . . . ). In this case, the weighting factors of respective evaluation values α, β and γ are changed and set as appropriate according to an evaluation value on which emphasis is desired to be put.

Thereafter, count line creation section 46 receives a selection instruction from a viewer of a moving information analysis image selected on the basis of line evaluation value ELx, selects an optimal count line in response to the selection instruction, and outputs the count line to people counting section CT (step S204).

Figure 22:
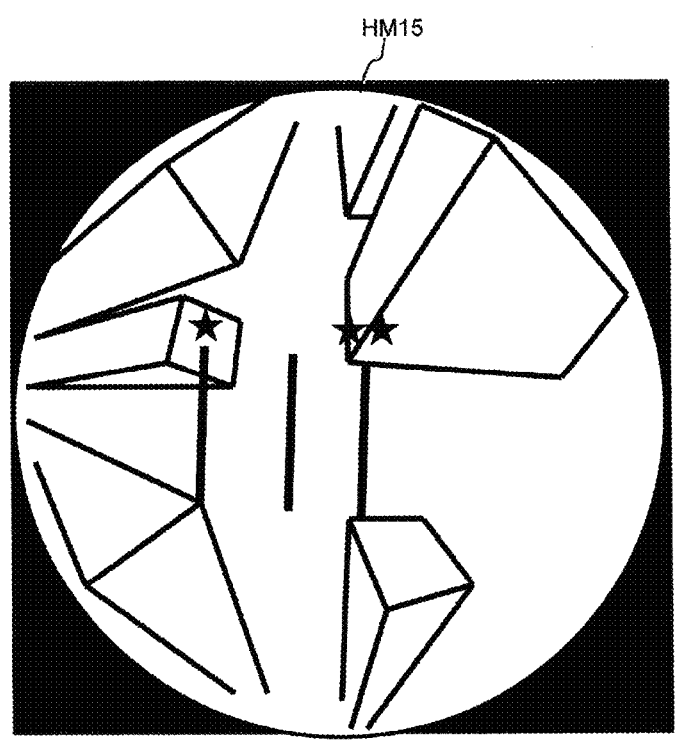
FIG. 22 is a diagram illustrating a display example of count line candidates displayed in a moving information analysis image.

FIG. 22 is a diagram illustrating a display example of count line candidates displayed in a moving information analysis image. In a display example illustrated in FIG. 22, three count line candidates which are created on the basis of an instruction from a viewer of a moving information analysis image, and recommendation marks based on line evaluation values corresponding to the respective count line candidates are displayed. The recommendation mark indicates the extent of recommendation of each count line candidate, and, in the illustrated example, indicates the extent of recommendation according to the number of stars according to a line evaluation value. The viewer of the moving information analysis image views the count line candidates of the moving information analysis image displayed on monitor 450, selects an optimal count line having a high extent of recommendation on the basis of the recommendation marks, and designates the selected count line in response to an input instruction or the like from input device 400.

As mentioned above, since a plurality of count line candidates are created, and a line evaluation value regarding each count line candidate is calculated, it is possible to select and set an optimal count line on the basis of the line evaluation value. Since a recommendation mark is displayed, a viewer of a moving information analysis image can visually recognize the recommendation mark and easily select an optimal count line.

In the above-described example, a description has been made of a configuration in which camera 101 generates moving information analysis image data as moving information and performs creation of a count line and counting of the number of moving objects passing the count line, and server 300 generates a moving information analysis image displaying the count line and a count result, but any other configuration may be employed. For example, there may be a configuration in which camera 101 generates moving information analysis image data and moving information analysis image on the basis of a captured image, and transmits the moving information analysis image to server 300 so that the moving information analysis image is displayed. Regarding display of a moving information analysis image, a single certain moving information analysis image may be displayed on a single operation screen, and a plurality of moving information analysis images whose capturing time points or capturing locations are different from each other may be displayed on a single operation screen. A plurality of moving information analysis images in which positions of a count line is different from each other may be generated and displayed with respect to the plurality of moving information analysis images whose capturing time points and capturing locations are the same as each other.

In moving information analyzing system 500A of the present exemplary embodiment, camera 101 captures an image of a monitoring object region, extracts moving information regarding a staying position or a passing position of a moving object included in the captured image, outputs a count line for counting the number of moving objects and a count result of the number of moving objects having passed the count line, related to the moving information, and transmits the captured image and the moving information to server 300 in a predetermined transmission cycle. Server 300 acquires the captured image and the moving information transmitted from camera 101, generates a moving information analysis image in which the moving information is superimposed on the captured image and to which the count line and the count result are added, and displays the moving information analysis image on monitor 450.

Consequently, moving information analyzing system 500A can set a count line at any position in a captured image, count the number of moving objects having passed the set count line, and generate a moving information analysis image to which a count result of moving objects at a desired appropriate count line is added. For example, in a case where moving information analyzing system 500A is provided in a store, the number of passing people not only at a doorway but also at a specific passage or the like can be counted and displayed, and can be visually presented to a viewer of a moving information analysis image. The viewer of the moving information analysis image can understand the number of visitors of a specific location, and can thus appropriately understand the number of visitors in the store. A more accurate number of people can be counted and displayed by avoiding a staying location of persons, and can be visually presented to the viewer of the moving information analysis image. According to moving information analyzing system 500A of the present exemplary embodiment, it is possible to generate an appropriate moving information analysis image in which the number of moving objects at any location in an imaging region can be easily understand.

In moving information analyzing system 500A, camera 101 creates a count line in response to an instruction from server 300, and counts the number of moving objects having crossed the created count line as a count result. Consequently, in moving information analyzing system 500A, for example, a count line can be set at any predetermined location on the basis of an operation instruction from a viewer of a moving information analysis image, and the number of moving objects having passed the set count line can be counted so as to be displayed in a moving information analysis image.

In moving information analyzing system 500A, camera 101 counts the number of bidirectional moving objects on a direction basis with respect to a single count line as a count result, and server 300 generates a moving information analysis image displaying directions from which moving objects have passed and direction-basis count results. Consequently, moving information analyzing system 500A can display directions from which direction of the count line the moving objects have passed, and the count number of moving objects on a direction basis. Thus, a viewer of a moving information analysis image can analyze the number of passing moving objects more in detail and can thus understand a situation of the moving objects more in detail.

In moving information analyzing system 500A, camera 101 creates a plurality of count lines, and counts the number of moving objects having passed each count line as a count result with respect to the plurality of count lines. Server 300 generates a moving information analysis image displaying a plurality of count lines having different display aspects as the count lines and count results respectively corresponding to the plurality of count lines. Consequently, in moving information analyzing system 500A, for example, a plurality of count lines are displayed in a moving information analysis image in an aspect in which colors or line types are different from each other, and thus it is possible to allow each count line and each count result to be easily visually recognized. A viewer of a moving information analysis image can accurately understand the number of passing moving objects at a specific location for each count line with respect to a plurality of count lines.

In moving information analyzing system 500A, camera 101 creates a plurality of count lines, and counts multiple numbers of moving objects having passed two or more count lines as count results with respect to the plurality of count lines. Server 300 generates a moving information analysis image displaying a plurality of count lines having different display aspects as the count lines and multiple count results of the number of moving objects respectively corresponding to combinations of the plurality of count lines. Consequently, in moving information analyzing system 500A, multiple numbers of passing moving objects at a plurality of count lines can be counted and displayed. Thus, a viewer of a moving information analysis image can accurately understand the number of moving objects having passed through each of paths based on combinations of a plurality of count lines, such as the number of people having crossed count lines A and B being n1, and the number of people having crossed count lines A and C being n2.

In moving information analyzing system 500A, server 300 generates a moving information analysis image displaying arrows having different thicknesses according to the number of moving objects having passed count lines. Consequently, in moving information analyzing system 500A, arrows having different thicknesses according to the number of moving objects having passed count lines can be displayed in a moving information analysis image, and a viewer of the moving information analysis image can intuitively easily understand the number of moving objects at each count line by viewing the arrows.

In moving information analyzing system 500A, camera 101 creates a plurality of count line candidates as count lines, and calculates line evaluation values for the plurality of count line candidates. Server 300 generates a moving information analysis image displaying the plurality of count line candidates and recommendation marks indicating the extent of recommendation corresponding to the line evaluation values. Consequently, in moving information analyzing system 500A, a plurality of count line candidates can be set, and a more appropriate count line can be selected from among the count line candidates so as to be set on the basis of the line evaluation values. A person who sets a count line, such as a viewer of a moving information analysis image, can easily select an optimal count line on the basis of a recommendation mark indicating the extent of recommendation corresponding to a line evaluation value.

As mentioned above, although the various exemplary embodiments have been described with reference to the drawings, needless to say, the present disclosure is not limited to the exemplary embodiments. It is obvious that a person skilled in the art can conceive of various modifications or alterations within the scope of the invention disclosed in the claims, and it is understood that they naturally fall within the technical scope of the present disclosure.

In the above-described embodiment, a moving object exemplifies a person (for example, purchaser) moving in a store, but is not limited to a person. For example, a moving object may be a vehicle or a robot. In a case where a moving object is a person, moving information of a purchaser (visitor) or a salesperson in a store is analyzed. In a case where a moving object is a vehicle, for example, moving information of a vehicle in a parking lot or a road may be analyzed, and a congestion situation such as traffic jam may be displayed in a moving information analysis image. In a case where a moving object is a robot, a robot which monitors a situation of a merchandise display shelf while circulating a store, and notifies a server of the store side of the situation, has been recently used, and a circulating situation of such a robot may be displayed in a moving information analysis image.

The present disclosure is useful as a moving information analyzing system, a camera, and a moving information analyzing method capable of generating an accurate moving information analysis image in which the number of moving objects at any location in an imaging region can be easily understand.

What is claimed is:
1. A moving information analyzing system comprising:
a camera; and
a server that is connected to the camera,
wherein the camera, in operation,
    captures an image of an object region,
    generates a background image of the object region,
    generates a count line illustrating a position for which a number of moving objects that pass the count line are counted,
    counts the number of moving objects having passed the count line in a predetermined transmission cycle to generate a count result, and
    transmits the background image, the count line and the count result of the number of moving objects having passed the count line in the predetermined transmission cycle to the server, and
wherein the server, in operation,
    receives the background image, the count line and the count result of the number of moving objects having passed the count line in the predetermined transmission cycle transmitted from the camera,
    generates a moving information analysis image in which the count line and the count result of the number of moving objects having passed the count line in the predetermined transmission cycle are added to the background image, and
    displays the moving information analysis image on a monitor connected to the server.

2. The system of claim 1, wherein the camera, in operation, generates the count line in response to an instruction from the server.

3. The system of claim 1, wherein the camera, in operation, counts a number of bidirectional moving objects on a direction basis as the count result with respect to the count line as a single count line, and wherein the server, in operation, generates the moving information analysis image displaying directions from which the moving objects have passed and the count result on a directional basis.

4. The system of claim 1, wherein the camera, in operation, generates a plurality of count lines, and counts a respective number of moving objects having passed each of the plurality of count lines as a respective count result, and wherein the server, in operation, generates the moving information analysis image displaying the plurality of count lines having different display aspects as the plurality of count lines and count results respectively corresponding to the plurality of count lines.

5. The system of claim 1, wherein the camera, in operation, generates a plurality of count lines, and counts multiple numbers of moving objects having passed two or more of the plurality of count lines as the count result, and wherein the server, in operation, generates the moving information analysis image displaying the plurality of count lines having different display aspects as the count lines and multiple count results of the number of moving objects respectively corresponding to combinations of the plurality of count lines.

6. The system of claim 1, wherein the server, in operation, generates the moving information analysis image displaying arrows having different thicknesses according to the number of moving objects having passed the count line.

7. The system of claim 1, wherein the camera, in operation, generates a plurality of count line candidates as the count line, and calculates line evaluation values for the plurality of count line candidates, and wherein the server, in operation, generates the moving information analysis image displaying the plurality of count line candidates and recommendation marks indicating an extent of recommendation corresponding to the line evaluation values.

8. The system of claim 1, wherein the camera, in operation, determines whether a moving object of the moving objects previously crossed a designated line prior to crossing the count line, and if the moving object of the moving objects previously crossed the designated line prior to crossing the count line, includes the crossing of the count line by the moving object in the count result.

9. The system of claim 8, wherein the camera, in operation, if the moving object of the moving objects did not previously cross the designated line prior to crossing the count line, the camera does not include the crossing of the count line by the moving object in the count result.

10. The system of claim 8, wherein the count result represents the number of moving objects that crossed a plurality of designated count lines.

11. A moving information analyzing method for a moving information analyzing system in which a camera is connected to a server, the method comprising:
causing the camera to:
capture an image of an object region,
generate a background image of the object region,
generates a count line illustrating a position for which a number of moving objects that pass the count line are counted, and
counts the number of moving objects having passed the count line in a predetermined transmission cycle to generate a count result, and
transmit the background image, the count line and the count result of the number of moving objects having passed the count line in the predetermined transmission cycle to the server; and
causing the server to:
receive the background image, the count line and the count result of the number of moving objects having passed the count line in the predetermined transmission cycle transmitted from the camera,
generate a moving information analysis image in which the count line and the count result of the number of moving objects having passed the count line in the predetermined transmission cycle are added to the background image, and
display the moving information analysis image on a monitor connected to the server.

12. The method of claim 11 further comprising:
causing the camera to generate the count line in response to an instruction from the server.

13. The method of claim 11 further comprising:
causing the camera to count a number of bidirectional moving objects on a direction basis as the count result with respect to the count line as a single count line, and
causing the server to generate the moving information analysis image displaying directions from which the moving objects have passed and the count result on a directional basis.

14. The method of claim 11 further comprising:
causing the camera to generate a plurality of count lines, and count a respective number of moving objects having passed each of the plurality of count lines as a respective count result, and
causing the server to generate the moving information analysis image displaying the plurality of count lines having different display aspects as the plurality of count lines and count results respectively corresponding to the plurality of count lines.

15. The method of claim 11 further comprising:
causing the camera to generates a plurality of count lines, and to count multiple numbers of moving objects having passed two or more of the plurality of count lines as the count result, and
causing the server to generate the moving information analysis image displaying the plurality of count lines having different display aspects as the count lines and multiple count results of the number of moving objects respectively corresponding to combinations of the plurality of count lines.

16. The method of claim 11 further comprising:
causing the server to generate the moving information analysis image displaying arrows having different thicknesses according to the number of moving objects having passed the count line.

17. The method of claim 11 further comprising:
causing the camera to generates a plurality of count line candidates as the count line, and to calculate line evaluation values for the plurality of count line candidates, and
causing the server to generate the moving information analysis image displaying the plurality of count line candidates and recommendation marks indicating an extent of recommendation corresponding to the line evaluation values.

18. The method of claim 11, further comprising:
determining whether a moving object of the moving objects previously crossed a designated line prior to crossing the count line, and
if the moving object of the moving objects previously crossed the designated line prior to crossing the count line, including the crossing of the count line by the moving object in the count result.

19. The method of claim 18, further comprising:
if the moving object of the moving objects did not previously cross the designated line prior to crossing the count line, refraining from including the crossing of the count line by the moving object in the count result.

20. The method of claim 18, wherein the count result represents the number of moving objects that crossed a plurality of designated count lines.

* * * * *